(12) United States Patent
Viger et al.

(10) Patent No.: US 12,048,001 B2
(45) Date of Patent: Jul. 23, 2024

(54) BACKOFF MANAGEMENT FOR INTRA-QUEUE PRIORITY TRANSMISSION IN COMMUNICATION NETWORKS

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 230 days.

(21) Appl. No.: 17/436,967

(22) PCT Filed: Mar. 6, 2020

(86) PCT No.: PCT/EP2020/056101
§ 371 (c)(1),
(2) Date: Sep. 7, 2021

(87) PCT Pub. No.: WO2020/182688
PCT Pub. Date: Sep. 17, 2020

(65) Prior Publication Data
US 2022/0174730 A1 Jun. 2, 2022

(30) Foreign Application Priority Data

Mar. 8, 2019 (GB) ..................................... 1903181
Apr. 4, 2019 (GB) ..................................... 1904791

(51) Int. Cl.
*H04W 74/08* (2024.01)
*H04L 47/50* (2022.01)
*H04L 49/90* (2022.01)

(52) U.S. Cl.
CPC ............. *H04W 74/08* (2013.01); *H04L 47/50* (2013.01); *H04L 49/90* (2013.01)

(58) Field of Classification Search
CPC ......... H04W 74/08; H04L 47/50; H04L 49/90
See application file for complete search history.

(56) References Cited

U.S. PATENT DOCUMENTS 7,457,820 B1  11/2008 Viger et al.
7,570,634 B2   8/2009 Shvodian
(Continued)

FOREIGN PATENT DOCUMENTS

WO    2009/069047 A1   6/2009

OTHER PUBLICATIONS

Mangold; Analysis of IEEE802.11e for QoS Support in Wireless LANs; 2003 (Year: 2003).*
(Continued)

*Primary Examiner* — Ricky Q Ngo
*Assistant Examiner* — Stephen N Steiner
(74) *Attorney, Agent, or Firm* — Venable LLP

(57) ABSTRACT

A communication method in a communication device includes storing a first type of data and a second type of data belonging to a same access category defined by IEEE802.11 series, contending for access according to an enhanced distributed channel access, EDCA, using first EDCA parameters, to a communication channel in order to transmit the first type of data to another communication device; and contending for access according to the EDCA, using second EDCA parameters different from the first EDCA parameters, to the communication channel in order to transmit the second type of data to the other communication device.

27 Claims, 16 Drawing Sheets

(56) References Cited

U.S. PATENT DOCUMENTS

| | | |
|---|---|---|
| 7,782,886 B2 | 8/2010 | Perez-Costa et al. |
| 8,812,633 B2 | 8/2014 | Viger et al. |
| 2002/0184573 A1 | 12/2002 | Rousseau et al. |
| 2005/0270977 A1* | 12/2005 | King .................. H04L 47/6245 |
| | | 370/235 |
| 2006/0039395 A1 | 2/2006 | Perez-Costa et al. |
| 2007/0047563 A1 | 3/2007 | Shvodian |
| 2011/0044258 A1 | 2/2011 | Nezou |
| 2016/0374112 A1* | 12/2016 | Asterjadhi ............ H04W 74/08 |

OTHER PUBLICATIONS

Notification of and International Search Report and Written Opinion mailed May 19, 2020, in corresponding International Patent Application No. PCT/EP2020/056101.

Hiertz, G. R. et al., "The Evolution of Wireless LANs and PANs—Analysis of IEEE802.11E for QOs Support in Wireless LANs." IEEE Personal Communications, IEEE Communications Society, vol. 10, No. 6, pp. 40-50. Dec. 1, 2003. XP011107079.

* cited by examiner

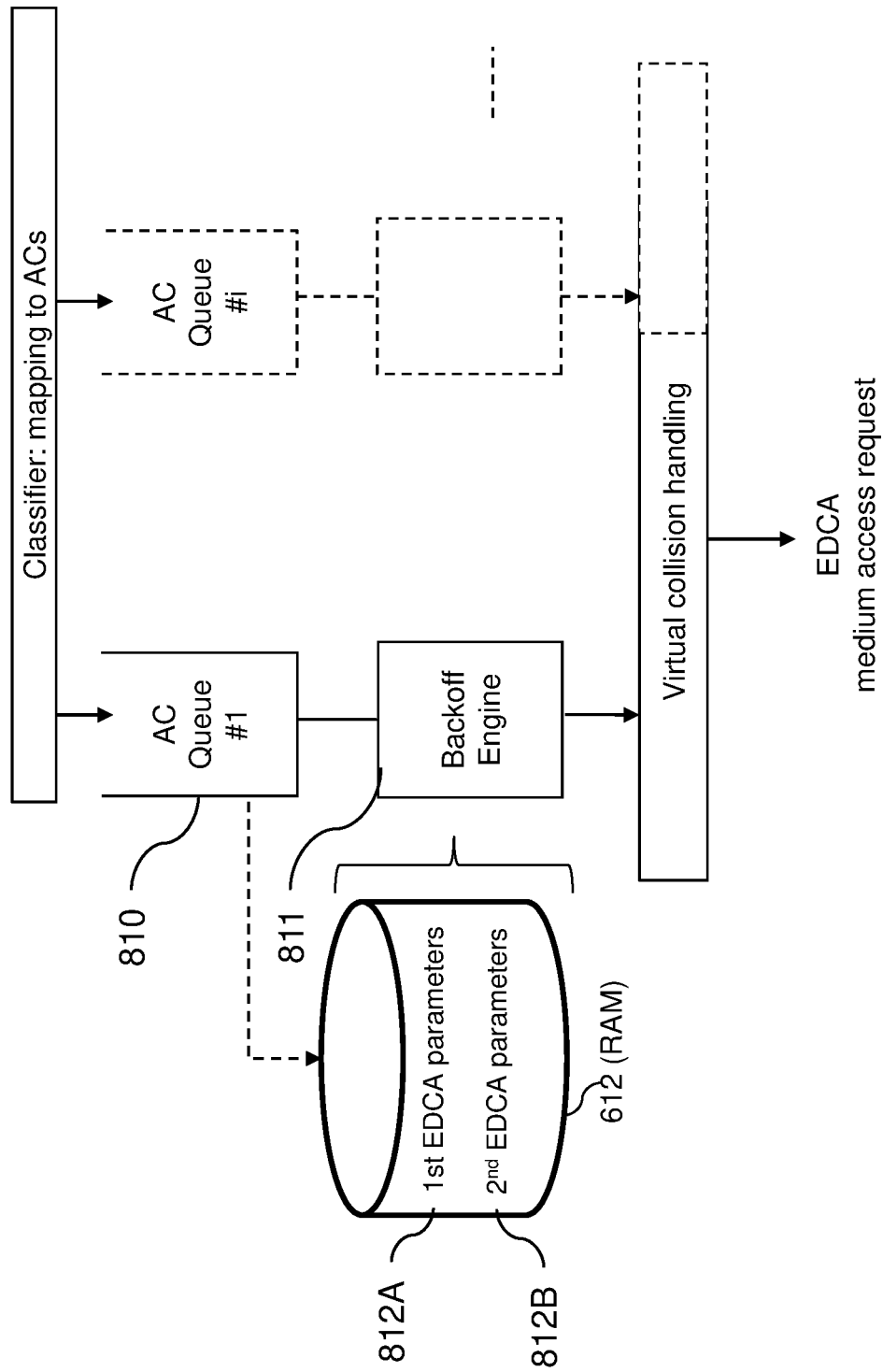

BACKOFF MANAGEMENT FOR INTRA-QUEUE PRIORITY TRANSMISSION IN COMMUNICATION NETWORKS

This application is a U.S. national stage application of International Patent Application No. PCT/EP2020/056101, filed Mar. 6, 2020, now published as International Publication No. WO 2020/182688 A1 on Sep. 17, 2020.

FIELD OF THE INVENTION

The present invention relates generally to communication networks and more specifically to wireless communication methods in a wireless network comprising an access point (AP) and a plurality of non-AP stations, and corresponding devices.

BACKGROUND OF THE INVENTION

The IEEE 802.11 family of standards (a/b/g/n/ac/etc.) define a way wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The original access DCF method has been improved into the well-known Enhanced Distributed Channel Access (EDCA) method, to consider prioritized data traffics when accessing communication channels of the network.

EDCA defines traffic categories and four corresponding access categories that make it possible to handle differently high-priority traffic compared to low-priority traffic.

Implementation of EDCA in the stations can be made using a plurality of traffic queues (known as "Access Categories (AC)") for serving data traffic at different priorities, each traffic queue being associated with a respective queue backoff counter. The queue backoff counter is initialized with a backoff value randomly drawn from respective queue contention parameters, e.g. EDCA parameters, and is used to contend for access to a communication channel in order to transmit data stored in the traffic queue.

According to the conventional EDCA mechanism, the values of the queue contention parameters are specific to each AC queue. Consequently, packets from different queues may be transmitted according to different priorities by setting appropriately the EDCA parameters. In other words, the priority for transmission is provided on a queue-by-queue basis (inter-queue priority).

However, the conventional EDCA mechanism (and other contention-based mechanisms) does not allow packets stored in a same traffic queue to be transmitted according to different priorities. In other words, conventional EDCA mechanisms do not handle intra-queue priority for transmission, i.e. on a frame-by-frame basis.

SUMMARY OF INVENTION

The present invention seeks to overcome the foregoing concerns by providing different aspects and embodiments.

For example, according to one aspect of the invention, there is provided a communication method in a communication device comprising: storing a first type data and a second type data belonging to a same access category defined by IEEE802.11 series; contending for access according to an enhanced distributed channel access, EDCA, using first EDCA parameters, to a communication channel in order to transmit the first type data to another communication device; and contending for access according to the EDCA, using second EDCA parameters different from the first EDCA parameters, to the communication channel in order to transmit the second type data to the other communication device.

According to another aspect of the invention, there is provided a communication method performed by a communication device of a communication network, the communication device comprising a traffic queue for serving data traffic, the traffic queue being capable of storing data (e.g. packets) of a first type and data (e.g. packets) of a second type, the method comprising computing a backoff value to be used to contend for access according to an enhanced distributed channel access, EDCA, to a communication channel in order to transmit data stored in the traffic queue, wherein the backoff value is computed using first EDCA parameters if the data to be transmitted is of the first type and using second EDCA parameters, different from the first EDCA parameters, if the data to be transmitted is of the second type. Advantageously, the use of different sets of EDCA parameters to compute a backoff value adapted to the frame to be sent provides an efficient intra-queue priority mechanism, which allows a fine-grained access to the medium.

According to embodiments of the invention, two sets of EDCA parameters are considered different if they differ by at least one parameter and/or parameter value, thereby changing the priority of transmission of a data packet.

In addition, this mechanism allows the management of access to be balanced between the AP and the station.

Correspondingly, there is provided a communication device in a communication network, the communication device comprising: a traffic queue for serving data traffic, the traffic queue being capable of storing data packets of a first type and data packets of a second type; a queue backoff engine associated with the traffic queue, the queue backoff engine being configured to compute a backoff value to be used to contend for access according to an enhanced distributed channel access, EDCA, to a communication channel in order to transmit a data packet stored in the traffic queue, wherein the backoff value is computed using first EDCA parameters if the data packet to be transmitted is of the first type and using second EDCA parameters, different from the first EDCA parameters, if the data packet to be transmitted is of the second type.

The communication device has the same advantages as the method defined above.

In particular, an efficient and low-cost implementation is achieved as a single queue backoff engine is associated with the traffic queue while being capable to manage different priorities through different parameters sets.

Optional features of the invention are further defined in the dependent appended claims. Some of these features are explained here below with reference to a method, while they can be transposed into device features dedicated to a communication device according to embodiments.

According to embodiments, the first type of packet and the second type of packet are defined so that a packet of the first type has priority over a packet of the second type for transmission, and any packet of the first type is referred to as a priority packet According to embodiments, the data packets of the first type comprise control data.

Advantageously, data packets of the first type comprise information to assist the Access Point to provide access to the medium for data packets of the second type.

According to embodiments, the control data provide information on the traffic queue.

According to embodiments, the control data comprise a Buffer Status Report, BSR.

According to embodiments, the control data comprise a QoS Data frame comprising traffic queue size information.

According to embodiments, the control data comprise a QoS_Null frame.

According to embodiments, the control data comprise an Operating Mode Indication (OMI) indicating a change of operating mode.

According to embodiments, the control data comprise a bandwidth query report, BQR.

According to embodiments, the control data relate to a management frame addressed to an Access Point different from an Access Point configured to manage access to a communication channel by a communication device of the communication network, in order to support discovery and/or association with the different AP.

According to embodiments, the control data indicate whether the amount of data currently stored in the traffic queue is higher than a given threshold.

According to embodiments, the control data indicate whether an occupancy ratio of the traffic queue is higher than a given threshold.

According to embodiments, the control data indicate whether the amount of data transmitted since a previous BSR is higher than a given threshold.

These embodiments in which control data are sent in priority allow to faster transmit the report to the AP, so that it can further react immediately to transient variations or discontinuities of real-time traffic flows at the stations that it administrates. By decreasing the packet delay for the priority frames, the mechanism ensures better traffic performance for the AP-centralized management of MU transmissions.

According to embodiments, the data packets of the first type relate to a frame intended to a peer-to-peer transfer between communication devices of a same communication cell.

According to embodiments, the frame is a Direct Link Setup, DLS, introduced in the 802.11e standard.

According to embodiments, the frame is a Tunneled Direct Link Setup, TDLS, introduced in the 802.11z standard.

According to embodiments, a packet is identified as a priority packet depending on the type of frame to which it relates.

According to embodiments, the first and second EDCA parameters each include: a minimum boundary CWmin and/or maximum boundary CWmax, both defining a selection range from which a size of a contention window is selected, and an Arbitration Inter-Frame Space Number, AIFSN.

According to embodiments, the backoff value corresponds to a number of time slots for which the communication device waits, in addition to the respective Arbitration Inter-Frame Space Numbers, AIFSN, before transmission of a packet, after the communication channel has been detected to be idle.

According to embodiments, the backoff value is computed based on the size of the selected contention window.

According to embodiments, the traffic queue is a FIFO queue.

According to embodiments, if the oldest data packet stored in the traffic queue is of the first type, the backoff value is computed using the first EDCA parameters and if the oldest data packet stored in the traffic queue is of the second type, the backoff value is computed using the second EDCA parameters.

According to embodiments, any new incoming packet of the first type is inserted in the traffic queue at the position of the oldest packet in the FIFO queue.

According to embodiments, if there is already a packet of the first type at the oldest position, the new incoming packet of the first type is inserted at the position of the oldest packet of the second type stored in the FIFO queue.

Advantageously, these embodiments allow new incoming packets of the first type (priority packet) to be transmitted in priority over stored packets of the second type. The Head-of-Line blocking commonly observed in FIFO queues can thus be avoided.

According to embodiments, the method comprises, upon arrival of a new incoming data packet of the first type in the traffic queue and if the last backoff value has been computed based on the second EDCA parameters, computing a new backoff value based on the first EDCA parameters.

According to embodiments, the method comprises, if the new backoff value is zero (i.e. upon expiry of the new backoff engine), transmitting the received data packet of the first type.

These embodiments allow preemption of priority packets in case of MU-EDCA scheme running.

According to embodiments, the method comprises computing a new backoff value upon successful transmission of a data packet of the first or second type stored in the traffic queue.

According to embodiments, the method comprises, before computing a new backoff value (i.e. before switching to a different parameter scheme), storing the current backoff value and/or the first or second EDCA parameters used to compute the current backoff value and/or a size of a current contention window.

It is indeed advantageous to memorize the current backoff value as it can be used subsequently for restoring the pre-empted context in case of switch back.

According to embodiments, the method comprises retrieving a previously stored backoff value and/or a size of a current contention window previously stored and/or the first or second EDCA parameters used to compute the previously stored backoff value.

According to another aspect of the invention, there is provided a communication method performed by a communication device of a communication network, the communication device comprising a traffic queue for serving data traffic, the traffic queue being capable of storing data of a first type and data of a second type, the method comprising computing a first backoff value and a second backoff value for the same traffic queue, wherein the first backoff value is to be used to contend for access according to an enhanced distributed channel access, EDCA, using first EDCA parameters, to a communication channel in order to transmit data of the first type stored in the traffic queue, and wherein the second backoff value is to be used to contend for access according to an enhanced distributed channel access, EDCA, using second EDCA parameters, different from the first EDCA parameters, to a communication channel in order to transmit data of the second type stored in the traffic queue.

Another aspect of the invention relates to a non-transitory computer-readable medium storing a program which, when executed by a microprocessor or computer system in a device, causes the device to perform a method as defined above.

The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 8 illustrates the concept of intra-queue priority according to embodiments of the invention;

DETAILED DESCRIPTION

The invention will now be described by means of specific non-limiting exemplary embodiments and by reference to the figures.

In the following description, the term legacy refers to non-802.11ax stations, meaning 802.11 stations of previous technologies that do not support OFDMA communications.

Figure 1:
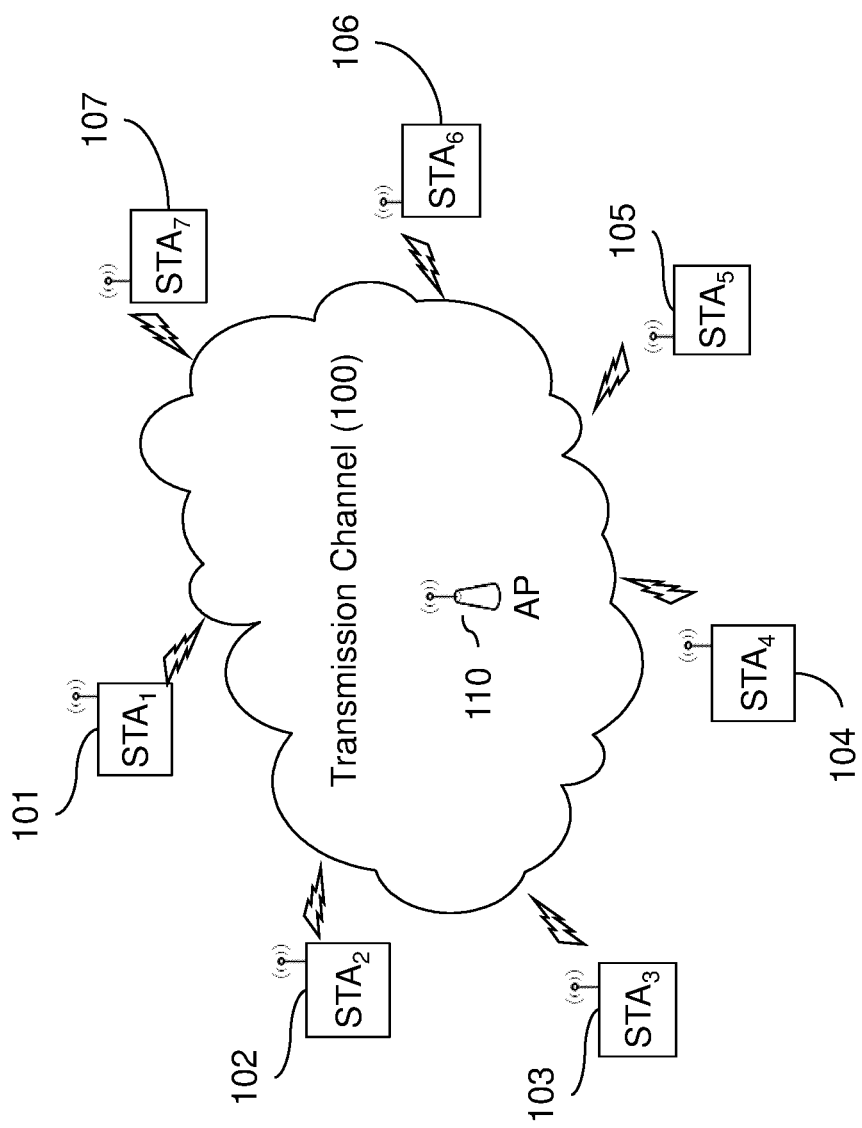
FIG. 1 illustrates a typical wireless communication system in which embodiments of the invention may be implemented.

FIG. 1 illustrates a communication system in which several communication stations (or "nodes") 101-107 exchange data frames over a radio transmission channel 100 of a wireless local area network (WLAN), under the management of a central station, or access point (AP) 110, also seen as a station of the network. The radio transmission channel 100 is defined by an operating frequency band constituted by a single channel or a plurality of channels forming a composite channel.

In the following, the word "station" refers to any kind of station. The wording "access point station", or in short "access point" (AP), refers to the station playing the role of access point 110. The wording "non-access point station", or in short "non-AP station", or client station (STA) refers to the other stations 101-107.

Access to the shared radio medium to send data frames is primarily based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting station, including the AP, first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source station continues to wait until the radio medium becomes idle.

The wireless communication system of FIG. 1 comprises an access point 110 configured to manage a group of stations which have previously registered to the AP; the group of stations forming a Basic Service Set (BSS). Such BSS managed by the AP is called an infrastructure BSS. In the following, the term BSS will be used as an equivalent of infrastructure BSS.

To access the medium, any source station, including the AP, starts counting down a backoff counter designed to expire after a number of timeslots, chosen randomly in a contention window [0, CW], where CW is an integer. The backoff mechanism or procedure, also referred to as channel access scheme, is the basis of the collision avoidance mechanism that defers the transmission time for a random interval, thus reducing the probability of collisions on the shared channel. After the backoff time expires (i.e. the backoff counter reaches zero), the source station may send data if the medium is still idle.

Management of quality of service (QoS) has been introduced at station level in the wireless networks, through an EDCA mechanism defined in the IEEE 802.11e standard.

Figures 2A, 2B:
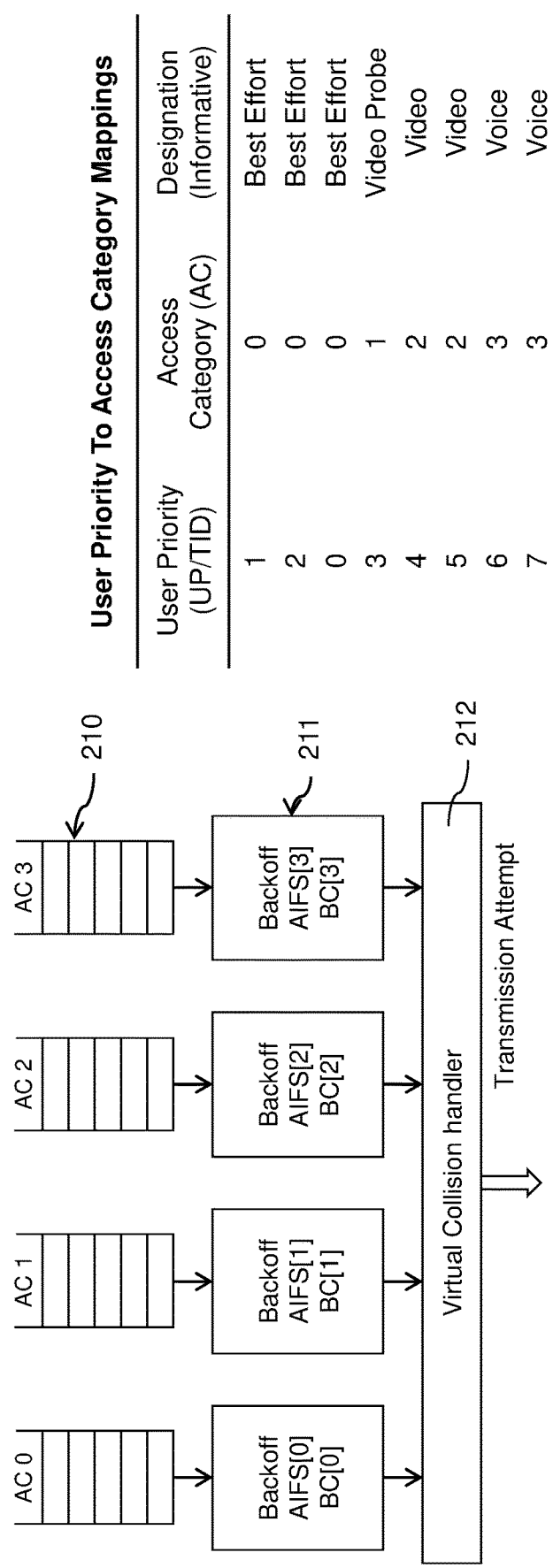
FIG. 2a illustrates the IEEE 802.11e EDCA involving access categories.
FIG. 2b illustrates an example of mapping between eight priorities of traffic class and the four EDCA ACs.

FIG. 2a illustrates the IEEE 802.11e EDCA mechanism involving access categories, in order to improve quality of service (QoS), to make more efficient use of the wireless medium.

The 802.11e standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed to support prioritized traffics similar to DiffServ (Differentiated Services), which is a protocol for specifying and controlling network traffic by class so that certain types of traffic get precedence.

EDCA is the dominant channel access scheme or mechanism in WLANs because it features a distributed and easily to be deployed mechanism. The scheme contends for access to at least one communication channel of the communication network using EDCA contention parameters, in order for the station to transmit data stored locally over an accessed communication channel.

The above deficiency of failing to have satisfactory QoS due to delay in frame retransmission has been solved with a plurality of transmission queues/buffers.

QoS support in EDCA is achieved with the introduction of four Access Categories (ACs), and thereby of four corresponding transmission/traffic queues or buffers (210). Usually, the four ACs are the following in decreasing priority order: voice (or "AC_VO"), video (or "AC_VI"), best effort (or "AC_BE") and background (or "AC_BG").

Of course, another number of traffic queues may be contemplated.

Each AC has its own traffic queue/buffer to store corresponding data to be transmitted on the network. The data may represent data frames, namely the MSDUs, incoming from an upper layer of the protocol stack are mapped onto one of the four AC queues/buffers and thus input in the mapped AC buffer.

Each AC has also its own set of queue contention parameters, and is associated with a priority value, thus defining traffics of higher or lower priority of MSDUs. Thus, there is a plurality of traffic queues for serving data traffic at different priorities. The queue contention parameters usually include CWmin, CWmax, AIFSN and TXOP_Limit parameters for each traffic queue. CWmin and CWmax are the lower and higher boundaries of a selection range from which the EDCA contention window CW is selected for a given traffic queue. AIFSN stands for Arbitration Inter-Frame Space Number, and defines a number of time slots (usually 9 μs), additional to a SIFS interval (the total defining the AIFS period—see FIG. 2b), the station must sense the medium as idle before decrementing the queue backoff counter associated with the traffic queue considered. TXOP_Limit defines the maximum size of a TXOP the station may request.

That means that each AC (and corresponding buffer) acts as an independent DCF contending entity including its respective queue backoff engine 211. Thus, each queue backoff engine 211 is associated with a respective traffic queue 210 for using queue contention parameters and drawing a backoff value (from CW) to initialize a respective queue backoff counter to be used to contend for access to at least one communication channel in order to transmit data stored in the respective traffic queue over an accessed communication channel.

The contention window CW and the backoff value are EDCA variables.

It results that the ACs within the same communication station compete one with each other to access the wireless medium and to obtain a transmission opportunity, using the conventional EDCA access scheme as explained above for example.

Service differentiation between the ACs is achieved by setting different queue backoff parameters between the ACs, such as different CWmin, CWmax, AIFSN and/or different transmission opportunity duration limits (TXOP_Limit). This contributes to adjusting QoS.

The use of different AIFSN values (to defer the decrementing of the backoff counters), additional to the use of an on-average lower CW, makes that traffic of high priority AC Queue has a higher chance to be transmitted than traffic from low priority AC: a station with high priority AC traffic statistically waits a little less, on average, before it sends its packet than a station with low AC priority traffic.

Referring to the four AC buffers (210) shown in FIG. 2a, buffers AC3 and AC2 are usually reserved for real-time applications (e.g., voice AC_VO or video transmission AC_VI). They have, respectively, the highest priority and the last-but-one highest priority.

Buffers AC1 and AC0 are reserved for best effort (AC_BE) and background (AC_BG) traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 2b shows an example of mapping between eight priorities of traffic class (also called Traffic Identification (TID), referring to values of User Priorities or UP between 0-7 according to IEEE 802.1d) and the four ACs. The data frame is then stored in the buffer corresponding to the mapped AC.

Figure 3:
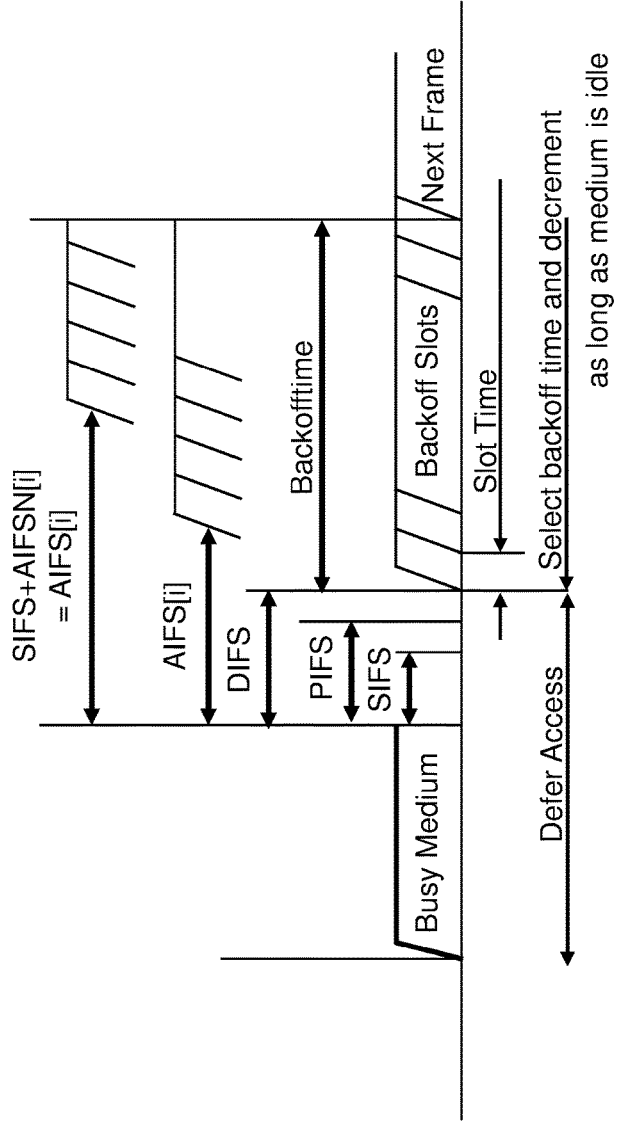
FIG. 3 illustrates 802.11e mechanism for the backoff counter countdown.

The impact of different AIFSNs is for instance shown in FIG. 3.

Each station must wait a fixed amount of time to ensure the medium is clear before attempting transmission. With DCF, the DIFS is constant for all types of traffic. However, with 802.11e the fixed amount of time that a station has to wait will depend on the access category and is referred to as the Arbitration Interframe Space (AIFS).

Using AIFS, each traffic queue 'i' awaiting transmission must wait until the medium is declared to be available through Clear Channel Assessment (CCA) and the Network Allocation Vector (NAV), not discussed here for brevity. Once the medium is available, each traffic queue 'i' must wait the corresponding AIFS[i] period (that includes the SIFS period deferring access to the medium) before decrementing its associated queue backoff counter.

Thus, each of the four traffic queues has a defined interframe space value corresponding to the priority assigned to the queue. For example, the AC_VO queue is the highest priority and as such has the lowest interframe space timer. The AIFS timers assigned by IEEE 802.11e are all defined as 1 Short Inter-Frame Spacing (SIFS) value plus a variable number of slots times (AIFSN) which are defined by the physical layer encoding method in-use (CCK, DSSS, OFDM). The values of EDCA parameter AIFS Number (AIFSN) are administrator configurable, with default values defined as the following:

AC_VO 1 $SIFS + 2*\text{slot time}$ ($AIFSN = 2$)

AC_VI 1 $SIFS + 2*\text{slot time}$ ($AIFSN = 2$)

AC_BE 1 $SIFS + 3*\text{slot time}$ ($AIFSN = 3$)

AC_BG 1 $SIFS + 7*\text{slot time}$ ($AIFSN = 7$)

To initiate transmission of data, a traffic queue in a station first randomly selects a backoff value for its backoff counter. The backoff value must be within the Contention Window values defined for the traffic queue, as already mentioned above. Similar to AIFS parameter, the differences between the contention windows of various traffic queues serve to prioritize traffic in higher priority queues by allowing them to wait shorter time intervals before being allowed to transmit over the air.

Once the appropriate AIFS[i] period expires, each traffic queue can begin decrementing its queue backoff counter by one at every slot time that passes.

Next, when the EDCA backoff procedure for a traffic queue (or an AC) ends (at least one backoff counter reaches zero), the MAC controller (in MAC layer referenced 704 in FIG. 7 below) of the transmitting station transmits a data frame from this traffic queue to the physical layer for transmission onto the wireless communication network.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink (DL) and uplink (UL) directions with an access point. In the uplink, multi-user transmissions can be used to mitigate the collision probability by allowing multiple non-AP stations to simultaneously transmit to the AP.

To actually perform such multi-user transmission, a granted 20 MHz channel (400-1 to 400-4) is split into at least one subchannel, but preferably a plurality of sub-channels 410 (elementary sub-channels), also referred to as sub-carriers or resource units (RUs) or "traffic channels", that are shared in the frequency domain by multiple users, based for instance on Orthogonal Frequency Division Multiple Access (OFDMA) technique.

This is illustrated with reference to FIG. 4.

In this example, each 20 MHz channel (400-1, 400-2, 400-3 or 400-4) is sub-divided in frequency domain into four OFDMA sub-channels or RUs 410 of size 5 MHz. Of course, the number of RUs splitting a 20 MHz channel may be different from four. For instance, between two to nine RUs may be provided (thus each having a size between 10 MHz and about 2 MHz). It is also possible to have a RU width greater than 20 MHz, when included inside a wider composite channel (e.g. 80 MHz).

Contrary to MU downlink OFDMA wherein the AP can directly send multiple data to multiple stations (supported by specific indications inside the PLCP header), a trigger mechanism has been adopted for the AP to trigger MU uplink communications from various non-AP stations.

To support a MU uplink transmission (during a TXOP pre-empted by the AP), the 802.11ax AP has to provide signalling information for both legacy stations (i.e. non-802.11ax stations) to set their NAV and for 802.11ax client stations to determine the Resource Units allocation.

Figure 4:
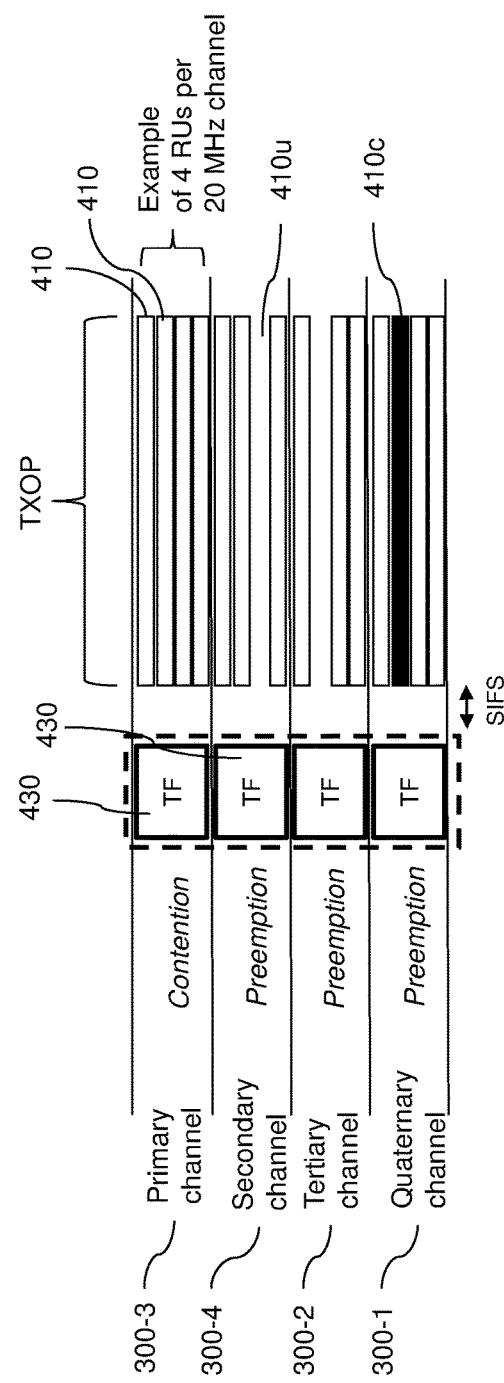
FIG. 4 illustrates, using a timeline, an example of 802.11ax uplink OFDMA transmission scheme, wherein the AP issues a Trigger Frame for reserving a transmission opportunity of OFDMA resource units on an 80 MHz channel as known in the art.

As shown in the example of FIG. 4, the AP sends a trigger frame (TF) 430 to the targeted 802.11ax stations. The bandwidth or width of the targeted composite channel is signalled in the TF frame, meaning that the 20, 40, 80 or 160 MHz value is signalled. The TF frame is sent over the primary 20 MHz channel and duplicated (replicated) on each other 20 MHz channel forming the targeted composite channel. Due to the duplication of the control frames, it is expected that every nearby legacy station receiving the TF frame (or a duplicate thereof) on its primary channel, then sets its NAV to the value specified in the TF frame. This prevents these legacy stations from accessing the channels of the targeted composite channel during the TXOP.

Based on an AP's decision, the trigger frame TF may define a plurality of resource units (RUs) 410. The multi-user feature of OFDMA allows the AP to assign different RUs to different client stations in order to increase competition. This may help to reduce contention and collisions inside 802.11 networks.

The trigger frame 430 may designate "Scheduled" RUs, which may be reserved by the AP for certain stations in which case no contention for accessing such RUs is needed for these stations. Such RUs and their corresponding scheduled stations are indicated in the trigger frame. For instance, a station identifier, such as the Association ID (AID) assigned to each station upon registration, is added in association with each Scheduled RU in order to explicitly indicate the station that is allowed to use each Scheduled RU. Such transmission mode is concurrent to the conventional EDCA mechanism, and the uplink data to be sent to AP is retrieved from the EDCA queues 210.

The trigger frame TF may also designate "Random" RUs, in addition or in replacement of the "Scheduled" RUs. The Random RUs can be randomly accessed by the stations of the BSS. In other words, Random RUs designated or allocated by the AP in the TF may serve as basis for contention between stations willing to access the communication medium for sending data. A collision occurs when two or more stations attempt to transmit at the same time over the same RU. An AID equal to 0 may be used to identify random RUs.

A random allocation procedure may be considered for 802.11ax standard based on an additional backoff counter (OFDMA backoff counter, or OBO counter or RU counter) for RU contention by the 802.11ax non-AP stations, i.e. to allow them for performing contention between them to access and send data over a Random RU. The RU backoff counter is distinct from the EDCA backoff counters 211. However, data transmitted in an accessed OFDMA RUs 410 is assumed to be served from same EDCA traffic queues 210.

As one can note, a station is not guaranteed to perform OFDMA transmission over a random RU for each TF received. This is because at least the RU backoff counter (OBO) is decremented upon each reception of a Trigger Frame by the number of proposed Random RUs, thereby differing data transmission to a subsequent trigger frame (depending of the current value of the RU backoff number and of the number of random RUs offered by each of further received TFs).

Back to FIG. 4, it results from the various possible accesses to the RUs that some of them are not used (410u) because no station with an RU backoff value less than the number of available random RUs has randomly selected one of these random RUs, whereas some other RUs have collided (for example 410c) because at least two of these stations have randomly selected the same random RU. This shows that due to the random determination of random RUs to access, collision may occur over some RUs, while other RUs may remain free.

Once the stations have used the Scheduled and/or Random RUs to transmit data to the AP, the AP responds with a Multi-User acknowledgment (not show in the Figure) to acknowledge the data on each RU.

Figure 5:
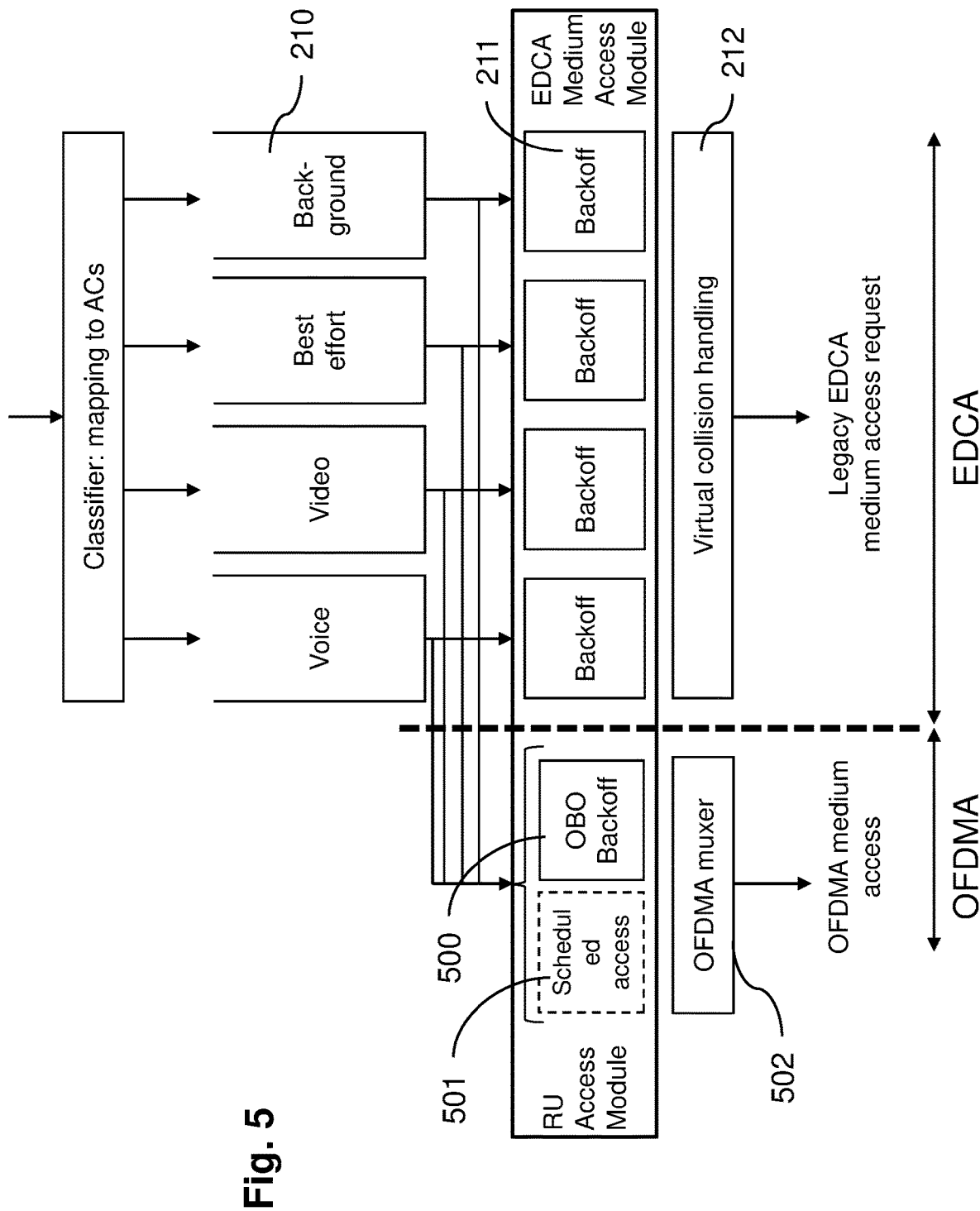
FIG. 5 illustrates an exemplary transmission block of a communication station according to the 802.11ax standard.

FIG. 5 illustrates an exemplary transmission block of a communication station according to the 802.11ax standard.

As mentioned above, the station includes an EDCA channel access module and possibly an RU access module, both implemented in the MAC layer. The EDCA channel access module includes: a plurality of traffic queues 210 for serving data traffic for a given AC priority; a plurality of queue backoff engines 211, each associated with a respective traffic queue for using a set of EDCA parameters, in particular to compute a respective queue backoff value, to be used by an associated backoff counter to contend for access to at least one communication channel in order to transmit data stored in the respective traffic queue. This is the EDCA access scheme.

The RU access module includes a scheduled Access module 501. Optionally, the RU access module may also include an RU backoff engine 500. These two modules are independent from the queue backoff engine 211 of the EDCA Medium Access module. The RU backoff engine 500 is for using RU contention parameters, in particular to compute an RU backoff value, to be used by an RU backoff counter to contend for access to the OFDMA random resource units defined in a received TF (sent by the AP for instance), in order to transmit data stored in a traffic queue in an OFDMA RU. The RU Scheduled Access module is used when the station is provided a scheduled RU by a trigger frame (UL RU identified as such through the AID of the station).

The RU Access module is associated with a transmission module, referred to as OFDMA muxer 502. For example, OFDMA muxer 502 is in charge, when the RU backoff value described below reaches zero, or when the station is assigned a RU with its station's AID, of selecting data to be sent from the AC queues 210.

The conventional AC queue backoff registers 211 drive the medium access request along EDCA protocol (channel contention access scheme), while in parallel, the RU access module 500/501 drives the medium access request onto OFDMA multi-user protocol (RU contention access scheme).

Although the EDCA access scheme taken alone provides a fair access to the medium throughout all the stations, its association with the MU UL OFDMA/RU access scheme introduces a drift in fairness. This is because, compared to the legacy stations, the 802.11ax stations have additional opportunities to send data frames through the resource units offered in the transmission opportunities granted to the AP.

To restore some fairness between the stations, the 802.11ax standard proposed to modify (e.g. penalize) a current value of at least one EDCA parameter (for instance: AIFSN, CWmin and/or CWmax) into different values (MU EDCA parameters), upon successfully transmitting data over an accessed resource unit (i.e. through UL OFDMA transmission). This has the effect of reducing the probability for the station to access a communication channel through (conventional EDCA) contention.

The proposed mechanism sets each transmitting traffic queue in a MU EDCA mode (or "MU mode") in response to successfully transmitting the data in the accessed MU UL OFDMA resource unit. The setting is done for a predetermined duration (HEMUEDCATimer). The MU EDCA mode is a mode in which the respective EDCA parameter set is modified into an MU parameter set, different from the legacy EDCA parameter set used in a different legacy EDCA mode.

Embodiments of the present invention provide an intra-queue priority mechanism based on using one of two different sets of EDCA parameters selected according to the data to be sent. In other words, embodiments of the present invention comprise selecting a first or a second contention-based access scheme depending on the type, first or second, of data to be transmitted from a same access category. Then following the selecting, and preferably, contending for access to a communication channel in order to transmit data stored in the corresponding traffic queue according to the selected contention-based access scheme.

According to an implementation, the first and second EDCA parameters may be chosen so that the first contention-based access scheme used to transmit priority frames is the legacy contention mode, while the second contention-based access scheme for transmitting conventional data is a "penalized" contention mode.

As will become apparent in the following description, embodiments are suitable for implementation within a wireless device, and especially in the transmission state machine of an 802.11 device.

Figure 6:
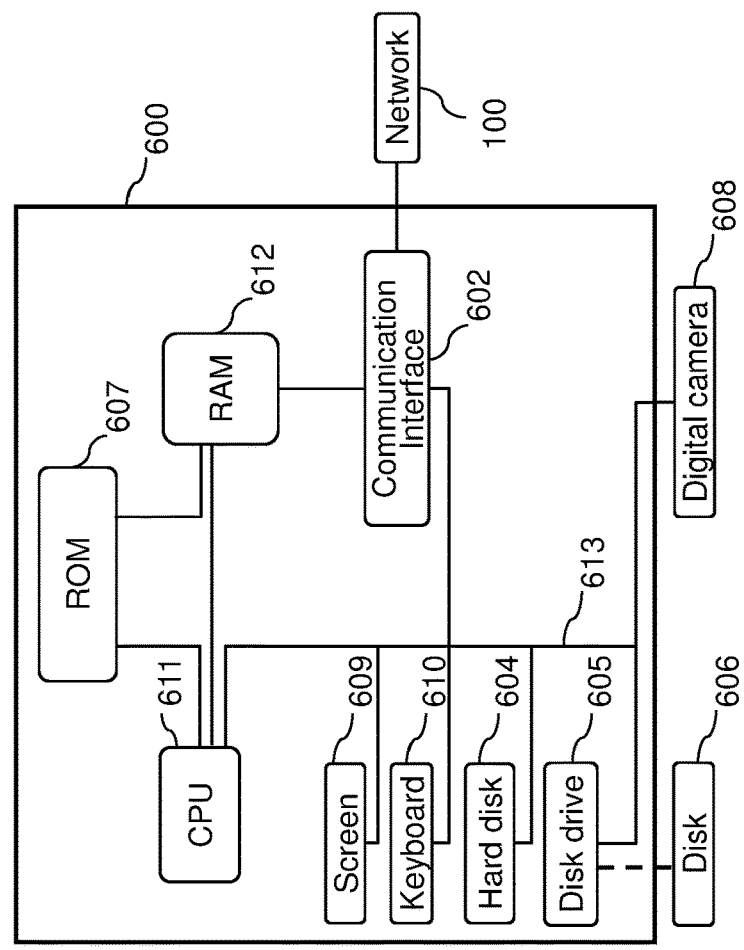
FIG. 6 shows a schematic representation a communication device or station in accordance with embodiments of the present invention.

FIG. 6 schematically illustrates a communication device 600 of a radio network configured to implement at least one embodiment of the present invention. The communication device 600 may preferably be a device such as a microcomputer, a workstation or a light portable device. The communication device 600 comprises a communication bus 613 to which there are preferably connected: a central processing unit 611, such as a microprocessor, denoted CPU; a read only memory 607, denoted ROM, for storing computer programs for implementing the invention; a random-access memory 612, denoted RAM, for storing the executable code of methods according to embodiments of the invention as well as the registers adapted to record variables and parameters necessary for implementing methods according to embodiments of the invention; and at least one communication interface 602 connected to the radio network over which data (digital data packets or frames or control frames) are transmitted. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components: a data storage means 604 such as a hard disk, for storing computer programs for implementing methods according to one or more embodiments of the invention; a disk drive 605 for a disk 606, the disk drive being adapted to read data from the disk 606 or to write data onto said disk; a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to embodiments of the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
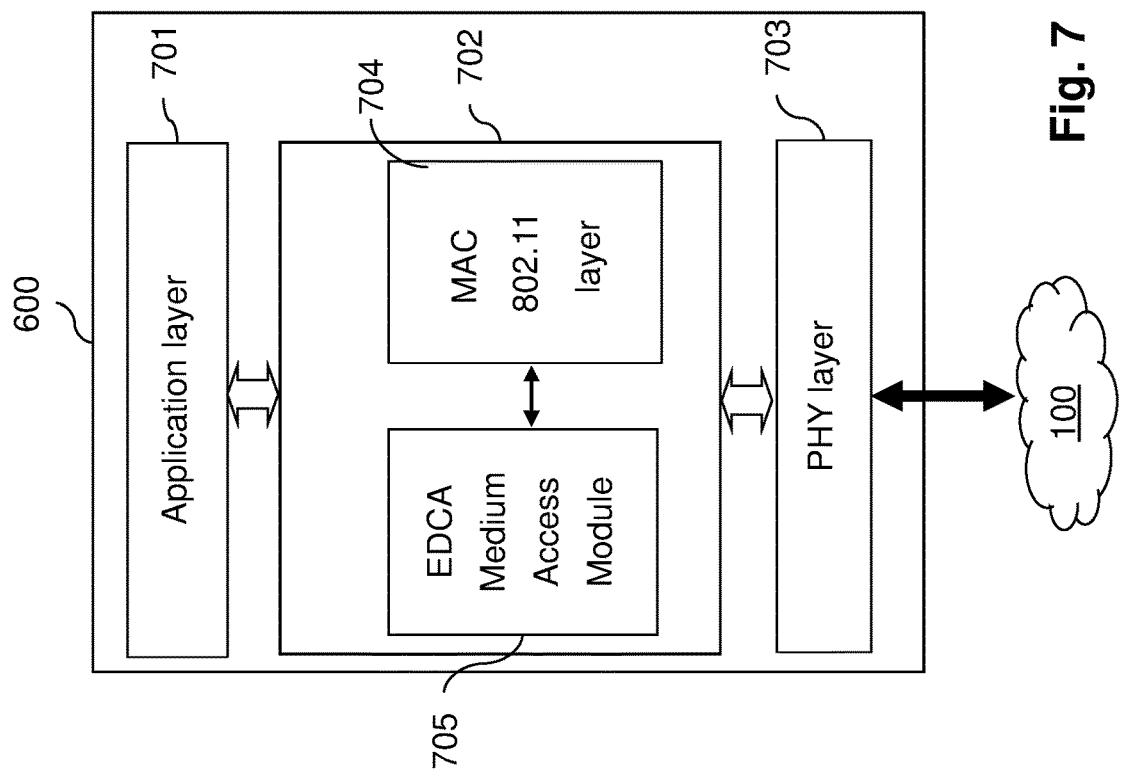
FIG. 7 shows a block diagram schematically illustrating the architecture of a wireless communication device in accordance with embodiments of the present invention.

FIG. 7 is a block diagram schematically illustrating the architecture of the communication device or node 600, in particular, one of stations 101-107, 110, adapted to carry out, at least partially, embodiments of the invention. As illustrated, station 600 comprises a physical (PHY) layer block 703, a MAC layer block 702, and an application layer block 701.

The PHY layer block 703 (e.g. a 802.11 standardized PHY layer) has the task of formatting, modulating on or demodulating from any 20 MHz channel or the composite channel, and thus sending or receiving frames over the radio medium, such as 802.11 frames, for instance single-user frames, such as control frames (RTS/CTS/ACK/Trigger Frame), MAC data and management frames, based on a 20 MHz width to interact with legacy 802.11 stations or with 802.11ax in legacy mode (such as for Trigger Frames), as well as MAC data frames of OFDMA type having preferably smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and an additional block 705 for carrying out, at least partially, embodiments of the invention. The MAC layer block 702 may optionally be implemented in software, which software is loaded into RAM 612 and executed by CPU 611.

Preferably, the additional block 705 referred to as EDCA medium access module 705 is configured to implement steps according to embodiments of the invention that are performed by the station 600.

MAC 802.11 layer 704 and EDCA medium access module 705 interact one with the other as needed for implementing embodiments of the invention.

On top of the Figure, application layer block 701 runs an application that generates and receives data packets, for example data packets of a video stream. Application layer block 701 represents all the stack layers above MAC layer according to ISO standardization.

Embodiments of the present invention are now illustrated using various exemplary embodiments.

These exemplary embodiments are mainly described in the context of IEEE 802.11ax by considering OFDMA resource units. Embodiments are, however, not limited to the IEEE 802.11ax context nor IEEE 802.11 further amendments (e.g. 802.11be). Also, mention of data frame, data packet and data units, PDU should not be read in a limitative way, and the teaching may apply to data in general.

Also, embodiments do not necessarily rely on the usage of a MU access scheme. And when usage of MU access scheme is considered is some proposed examples, it is not necessarily that described in 802.11ax standard. Any other RU access scheme defining alternate medium access schemes allowing simultaneous access by the stations to same medium can also be considered.

FIG. 8 illustrates the concept of intra-queue priority according to one aspect of the invention.

In the illustrated example, the station includes at least one AC queue 810 (#1, #i) and a backoff engine 811 attached to the AC queue 810. The backoff engine may be implemented so as to be configured by at least two contention parameter sets of a same EDCA access module.

According to embodiments, the backoff engine computes a backoff value to be used to contend for access, to a communication channel, using first EDCA parameters (812A) in order to transmit a data packet of a first type stored in the traffic queue, or using second EDCA parameters (812B), different from the first EDCA parameters (812A), in order to transmit a data packet of a second type stored in the traffic queue.

According to embodiments, the first type of packet and the second type of packet are defined so that a packet of the first type has priority over a packet of the second type for transmission. In the following description, a packet of the first type may be referred to as a priority packet.

Hence, according to these embodiments, the priority for transmission is provided on a frame-by-frame basis (intra-queue priority) depending on which frame has to be transmitted. This sharply contrasts with existing prioritized MAC schemes of the prior art which more conventionally tend to separate real-time and not-real-time traffics in different queues or access categories, and provide strict priority scheduling of those queues towards one single medium access backoff engine using a single set of EDCA parameters. In other words, in the prior art, the priority for transmission is provided on a queue-by-queue basis (inter-queue priority) based on a queue backoff per queue configured by common parameters, independently from the type (priority or not) of the frame to be transmitted.

According to embodiments, the AC queue 810 is a conventional AC queue 210 running a FIFO distribution. In these embodiments, when the backoff counter is reset or has to be recomputed, the backoff engine is computed using the first parameters if the oldest data packet stored in the traffic queue is of the first type and the backoff engine is computed using the second parameters if the oldest data packet stored in the traffic queue is of the second type.

While a backoff engine is active, meaning that its value is not equal to zero, it is never recomputed and transmission of the packet is suspended until the backoff counter has expired. An example is described in further detail with reference to FIG. 10.

According to further embodiments, the FIFO principle is modified by positioning a packet of the first type at the position of the oldest packet within the FIFO queue (or, in variants, at the position of the oldest packet of the second type). An example is described in further detail with reference to FIGS. 11 and 12. In this case, if the backoff value is zero, the oldest data packet of the first type stored in the traffic queue is transmitted.

In some cases, if the backoff value is zero, the oldest data packet stored in the traffic queue is transmitted according to a conventional FIFO, no matter the parameters type used to compute the backoff.

According to yet further embodiments, if the backoff value is non-zero and was originally computed using parameters of second type and a data packet of the first type is received to be stored in the traffic queue, the backoff value along with current parameters of second type are stored in memory, and a new backoff value is computed from parameters of the first type (for instance retrieved from memory) in order that data packet of the first type be transmitted upon backoff expiry.

According to the 802.11e standard, the traffic from two User Priorities (or TID) are mixed in an AC queue but once filled-in, those frames are no longer prioritized into the AC queue which acts as a conventional FIFO.

In contrast, embodiments of the present invention provide for intra-queue priority. More specifically, embodiments of the present invention introduce a new segregation of traffic frames inside the queue 810, which is independent from the original UP/TID classification. In other words, in a single TID point of view, embodiments of the present invention provide intra-TID prioritisation wherein frames having a same TID identification may have different priorities for EDCA medium access contention.

In a variant, segregation of traffic frames inside the queue 810 is performed to restore and match original UP/TIP classification by defining as many data packet types as necessary. For example, User priorities (UP/TID) 0, 1 and 2 are mapped to Best Effort (BE) AC queue. For this BE AC queue, a first, second and third data packet types (priorities) are defined matching the three User priorities for transmission according to embodiments of the invention.

Figure 9:
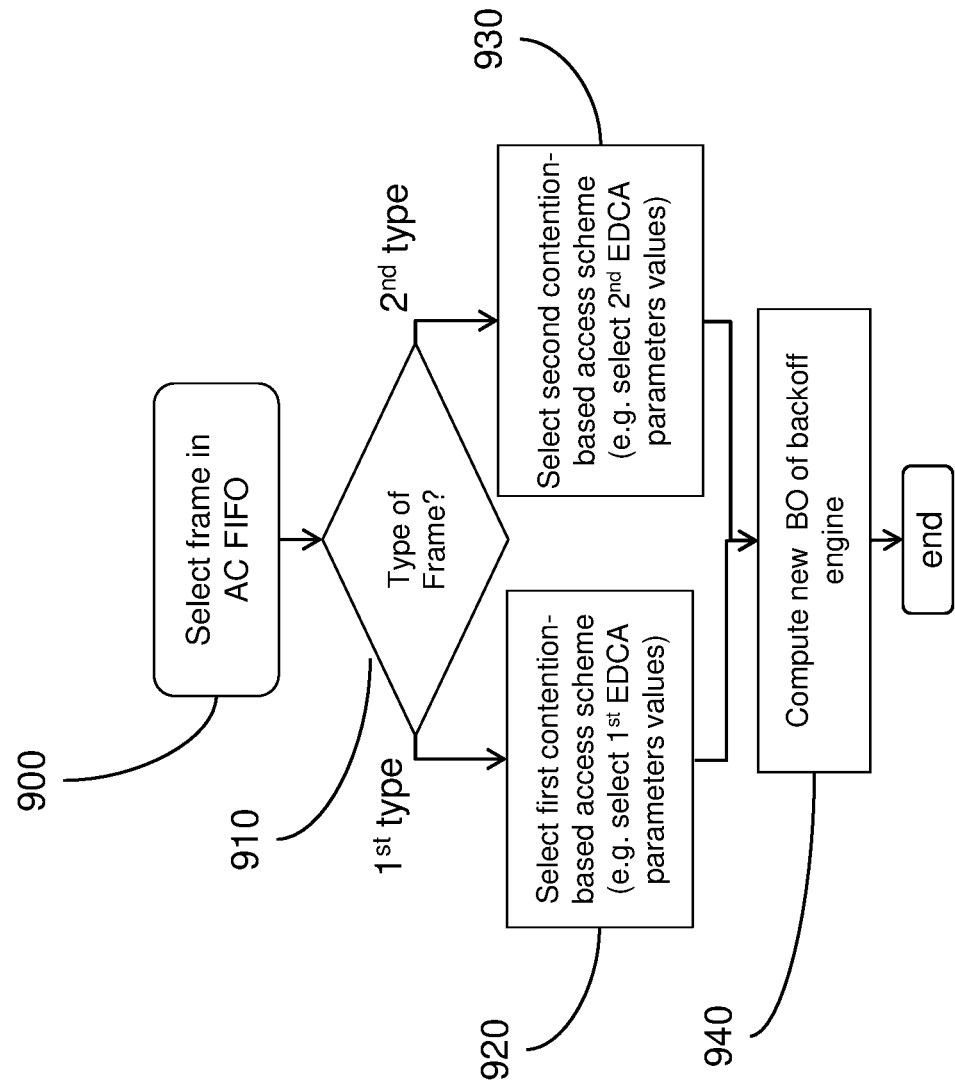
FIG. 9 illustrates, using a flowchart, general steps of a method according to embodiments of the invention.

FIG. 9 illustrates, using a flowchart, general steps of a method according to first embodiments of the invention.

These steps are for instance performed by the MAC layer 702 of station 600 according to embodiments, for instance upon receiving new data to transmit (e.g. an MSDU packet) from an upper layer (e.g. from the application layer 701) or when accessing the medium based on the EDCA medium access scheme.

At step 900, a frame is selected in the traffic queue. According to embodiments, this frame is the oldest frame stored in the traffic queue, which runs according to a conventional FIFO queue, meaning that the oldest packets of the queue are transmitted first.

Figure 10:
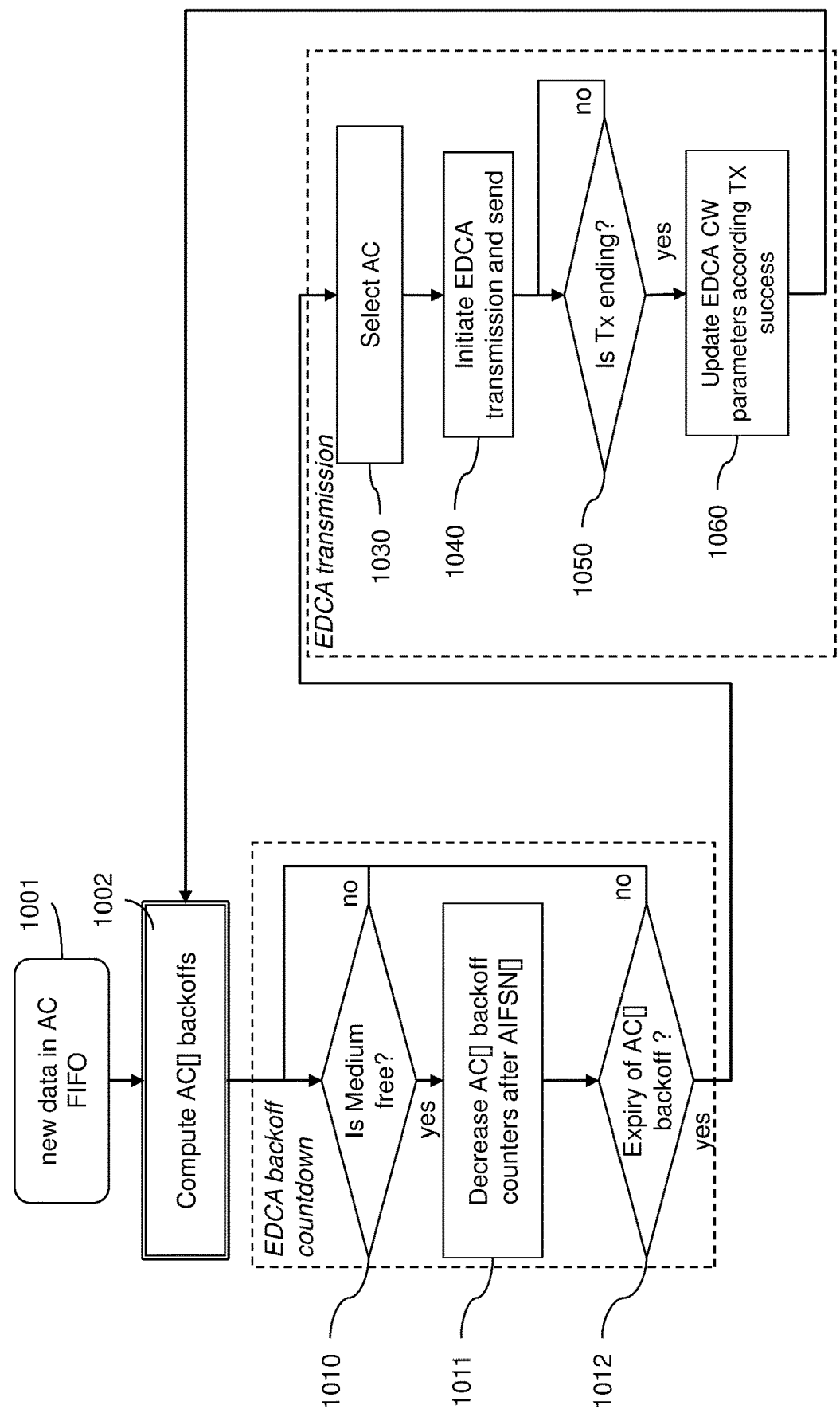
FIG. 10 illustrates, using a flowchart, general steps of accessing the medium based on the EDCA medium access scheme upon arrival of a new incoming data packet to be transmitted, according to first embodiments of the invention.

According to embodiments shown on FIG. 10, incoming packets are stored in the queue according to a conventional FIFO principle so that the oldest packet of the queue is the first packet inserted in the queue.

Figure 11:
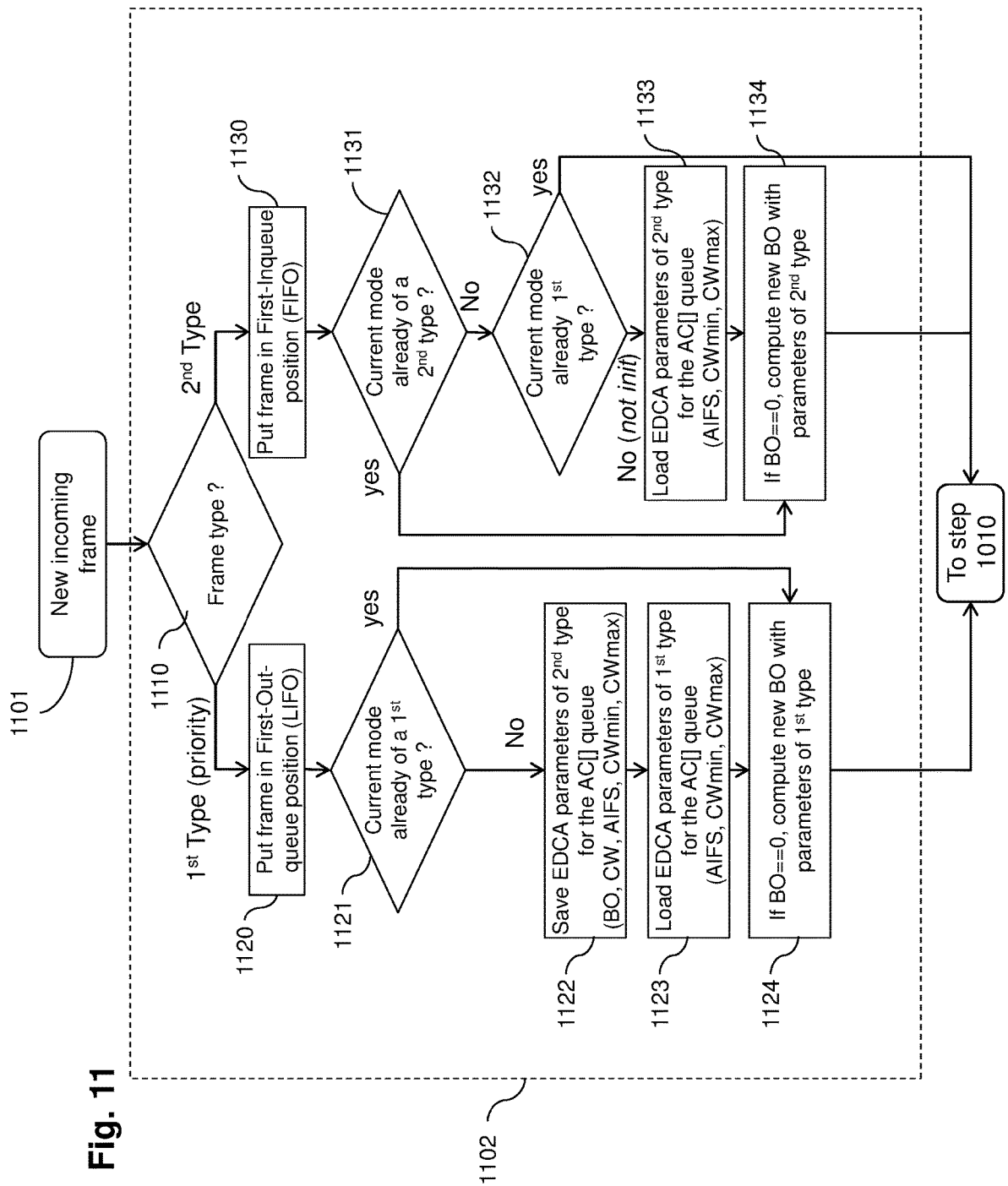
FIG. 11 illustrates, using a flowchart, steps of accessing the medium based on the EDCA medium access scheme for transmitting a new incoming frame (not already stored), according to second embodiments of the invention.

According to further embodiments shown in FIG. 11, first type packets and second type packets are inserted in the queue according to different principles. More specifically, incoming packets of the second type are stored in the queue according to a conventional FIFO principle while incoming packets of the first type (priority packets) are stored in the queue according to a LIFO principle, meaning that they are inserted at the position of the oldest packets of the FIFO queue even if they are the most recent packets, so as to be selected in priority for transmission. Optionally, if there is already a packet of the first type at the oldest position of the traffic queue, the new incoming packet of the first type may be inserted at the position of the oldest packet of the second type stored of the traffic queue.

Advantageously, the further embodiments allow new incoming packets of the first type (priority packet) to be transmitted in priority over stored packets of the second type. The Head-of-Line blocking commonly observed in FIFO queues can thus be avoided.

According to yet further embodiments, the newly incoming packets may be inserted at a different location in the AC queue than the first and second embodiments. For example, the station may decide to let the current backoff continue and so the existing ready-to-send non-priority frame remains at the front position of the queue (that is to say this frame is kept as the next one to be de-queued for transmission). As a result, the new priority frame can be inserted as the second position, that is to say at a position in the queue after the current intended TXOP length. The current EDCA medium access is thus unchanged, while the next EDCA attempt will be configured with first type EDCA contention parameters.

Back to the illustrated example, at step 910, the selected frame is analyzed in order to determine the type of the selected frame. In the illustrated example, the frame is categorized either as a first type (priority) frame or as a second type frame (non-priority). According to embodiments, a packet may be identified as a priority packet depending on the type of frame to which it relates or its content. For instance, control frames may have priority over media data frames. Several examples of priority frames are provided below.

If the selected frame is identified as a priority frame (first type), a first set of EDCA parameters (or values) is selected at step 920. This first set is used to compute a backoff value, to be used by an associated backoff counter to contend for access to at least one communication channel in order to transmit data stored in the traffic queue. This defines the first EDCA access scheme. More generally, this may be any first contention-based access scheme using the backoff engine.

If the selected frame is not a priority frame (second type), a second set of EDCA parameters different from the first set is selected at step 930. This second set is used to compute a backoff value, to be used by an associated backoff counter to contend for access to at least one communication channel in order to transmit data stored in the traffic queue. This defines the second EDCA access scheme. More generally, this may be any second contention-based access scheme using the backoff engine and that is configured to have a lower probability to gain access to the communication channel than the first contention-based access scheme.

In both cases, the computation of the backoff value BO is performed at step 940 based on the selected first or second contention-based access scheme. In an implementation, the computation of the backoff value is based on the EDCA parameters selected at step 920 or 930.

According to embodiments, two sets of EDCA parameter values are used alternately for configuring a same EDCA contention access engine for a given AC queue. The station thus implements a medium access mechanism with collision avoidance based on a computation of backoff value according to the type of stored data in the queue.

More generally, any two contention-based access schemes capable of handling different priorities can be used.

In further detail, a queue backoff value may correspond to a number of time slots for which the station waits, for instance in addition to an AIFS period, after the communication medium has been detected to be idle, before accessing to the medium.

According to embodiments, the first EDCA parameters may be based on a non-degraded state and the second EDCA parameters may be based on MU-EDCA parameters, which can be seen as a degraded/penalized state.

Examples of priority frames are now provided.

According to embodiments, the frames set as priority frames (i.e. corresponding to the data packets of the first type) may comprise information to assist the Access Point to provide access to the medium. According to embodiments, the priority data packets comprise control data.

For example, priority frames are generated by the communication station 600 in order to assist the AP to adjust its MU scheduling.

For instance, priority frames may come from the Application layer 701, along with the data frames they are related to.

According to embodiments, the control data provide information on the traffic queue.

For instance, priority frames may be generated by the EDCA medium access module 705. These priority frames may report the status of the corresponding AC queue.

According to embodiments, the control data comprise a Buffer Status Report, BSR, issued by the station.

According to embodiments, the control data comprise a QoS Data frame comprising traffic queue size information. According to embodiments, the control data comprise a QoS_Null frame. A QoS_Null frame is a specific QoS Data frame that contains the QoS Control field with queue size information, but without data payload.

Once the AP has obtained buffer reports for a set of stations of its BSS, it can specifically poll them through scheduled resource unit allocation. The present mechanism allows to faster transmit the report to the AP, so that it can further react immediately to transient variations or discontinuities of real-time traffic flows at the stations 600 that it administrates. By decreasing the packet delay for the priority frames, the mechanism ensures better traffic performance for the AP-centralized management of MU transmissions.

Technically, the 802.11ax standard extends the usage of queue size information in a new QoS Control field, namely HE Control, and possibly in replacement of QoS Control field for 802.11ax frames, in order to inform about several, and preferably all, traffic queues 210/810 of the station, instead of only one as proposed in 802.11e standard. If such format is used for generating a priority frame to assist the AP, the frame should be filled in the AC queue corresponding the higher TID of the reported 810 queues (AC_VOICE being the highest priority queue with regards to 802.11e).

For example, an AC queue may store video data frames along with associated priority frames generated by the communication station 600 in order to assist the AP to adjust its MU scheduling.

In a variant, instead of being inserted into an AC queue, the BSR could be generated "on the fly" by the station in order to be transmitted on the medium without passing through an AC queue.

Generally speaking, the "on the fly" way of generating control frames is not limited to BSR frames and could be envisaged for any requirement perceived by the station and that is mandatory to be urgently emitted to assist the AP.

According to embodiments, the control data comprise an Operating Mode Indication (OMI) indicating a change of operating mode. By using it, a station may thus report an Operating Mode Indication (OMI) change to its associated AP.

According to embodiments, the control data comprise a bandwidth query report, BQR. A station may use it to assist its AP in allocating DL MU and UL MU resources. For example, a station may face difficulties on given wireless channel(s) and may report this issue to its AP in order to be switched onto better channels.

According to embodiments, the control data relate to a management frame for the attention to an Access Point different from the Access Point configured to manage access to a communication channel by a communication device of the communication network, in order to support discovery and/or association with the different AP.

According to embodiments, the control data comprise report frames indicating to the AP an issue for delivering pending frames in MU scheme. For example, the stored frame cannot fit into (i.e. have larger duration than) the allowed duration of the UL RU, so the AP must be aware of this issue for correctly tuning next UL RUs.

According to embodiments, the control data may indicate whether the amount of data currently stored in the traffic queue is higher than a given threshold. For instance, the control data may indicate whether an occupancy ratio of the traffic queue is higher than a given threshold. In a variant, the control data may indicate whether the amount of data transmitted since a previous BSR is higher than a given threshold.

A complimentary embodiment may consist in tagging priority for data frames intended to direct station-to-station frame transfers within a basic service set. Hence, any data packet related to a frame intended to a peer-to-peer transfer (during which the traffic is not intended to pass through the AP) between communication devices of a same communication cell (a Basic Service Set, BSS) may be set as priority data.

For instance, such a frame is a Direct Link Setup, DLS, introduced in the 802.11e standard. It may also concern a Tunneled Direct Link Setup, TDLS, introduced in the 802.11z standard.

FIG. 10 illustrates, using a flowchart, general steps performed by the MAC layer 702 of station 600 according to embodiments, for instance upon arrival of new incoming data to transmit (e.g. an MSDU packet) from an upper layer (e.g. from the application layer 701) or when accessing the medium based on the EDCA medium access scheme.

It is assumed that at the very beginning of the process, none of the traffic queues 810 stores data to transmit.

Therefore, no queue backoff value 811 has been computed yet. The corresponding Access Category AC are/is thus "inactive".

According to embodiments, upon receiving first data to be stored in a traffic queue, a queue backoff value is computed using EDCA parameters selected among several sets of EDCA parameters, said selecting depending on the type of these first data. The associated queue backoff engine 811 is thereby "activated" using the computed backoff value.

Then, when receiving further data to be stored in the traffic queue 810, the associated backoff 811 is updated depending on the data to be transmitted over the medium.

A detailed example of this process is now described.

At step 1001, new data (e.g. video data or control data) are received from a local application running on the device (for instance, from the application layer 701), from another network interface (including a MAC Layer Management Entity (MLME) of 702) or from any other data source. The new data are ready to be sent by the station over the network. The station determines in which AC queue 810 the data should be stored. This operation is usually performed by checking the TID (Traffic Identifier) value attached to the data. Next, data frames are stored in the determined AC queue, that is to say the AC queue having the same AC type as the incoming data frame.

In this example, it is assumed that data storage in AC[ ] queue is a prerequisite of any EDCA medium access tentative as the backoff engine 811 conventionally starts (i.e. is activated) when a packet is received in the AC queue.

At step 1002, the station is in charge of computing the backoff value to be used in the procedure to initiate a medium access. To do so, steps 900 to 940 shown in FIG. 9 are performed. In a variant, this step may consist in retrieving a stored interrupted backoff value BO (stored upon pre-emption as described with reference to FIG. 11) from memory.

During the operation, when the current backoff has expired, a new backoff value may be computed according to the same procedure.

According to embodiments, when, during the operation, a new incoming frame of a first type (a priority frame) is ready to be transmitted, the currently running backoff countdown may be interrupted and a new backoff value may be computed.

For instance, if the station has determined at step 910 that the frame selected at step 900 is a priority (first type) frame, the station computes a new queue backoff value as being equal to a random value selected in range [0, CW], where CW is the current value of the contention window of the EDCA (non-degraded) scheme at steps 920 and 940.

According to embodiments, the current backoff countdown is interrupted under certain conditions only. For instance, the current backoff countdown is interrupted only if the frame to be transmitted is a priority frame and if the current queue backoff was originally computed using a MU EDCA (penalty, degraded) scheme (meaning that the first data to transmit were non-priority data). The station may then compute a new queue backoff value using non-degraded EDCA parameters, which will have the effect of reducing the waiting time for transmission of the priority frame.

In these embodiments, a priority frame may pre-empt a current active backoff countdown so as to be transmitted in priority. An example of these embodiments is described in further detail with reference to FIG. 11.

It is recalled here that the queue backoff value will be added to the AIFS in order to implement the relative priorities of the different access categories. CW is a contention window value that is selected from the range [CWmin, CWmax], where both boundaries CWmin and CWmax depend on the considered AC and the (degraded or not degraded) EDCA parameter scheme.

According to embodiments, the station stores the current queue backoff parameters in memory before switching to a different parameter scheme. Next, the station may retrieve from memory previous queue backoff parameters corresponding to the new parameter scheme to be used for the queue backoff value computation. Typically, the queue backoff parameters to store/retrieve are the queue contention parameters such as AIFSN, CWmin and/or CWmax.

According to embodiments, the queue backoff parameters also include the current EDCA contention window CW selected from the range [CWmin, CWmax]. This value is interesting as it informs the station of the medium contention as currently perceived over the wireless channel. Of course, if the stored CW is too old to be used for the current transmission (for example, if it is older than a TBTT interval, value commonly set as 100 ms), then the station may decide to set a new contention window CW, for instance set to the stored CWmin value.

Once data are stored in the AC queues, the station may access the medium either directly using an EDCA access scheme (via expiration of the backoff engine 811), or using resource units provided by the AP through one or more trigger frames, as previously described with reference to FIG. 4.

Steps 1010 to 1012 illustrate an EDCA backoff countdown, aiming at limiting the number of collisions that may occur on a shared wireless medium.

At step 1010, the station 600 senses the medium until it becomes idle. In practice, the medium is detected as being idle when the energy detected on the primary channel is below a given threshold.

When the medium becomes idle during an AIFS[i] period plus one slot time, the step 1011 is executed. During this step, the station 600 starts decrementing by one all the active (non-zero) AC[ ] queue backoff counters 811. In other words, the station decrements the queue backoff values each time the communication channel is detected as idle.

Then, at step 1012, the station 600 determines whether at least one of the AC backoff counters 811 has reached zero.

If no AC queue backoff has reached zero, the station 600 waits for another backoff timeslot (for instance 9 µs), and thus loops back to step 1010 in order to sense the medium again during the next backoff timeslot. This makes it possible to decrement the AC backoff counters at each new backoff timeslot when the medium is sensed as idle, as soon as their respective AIFS[i] has expired.

Otherwise, the process continues to step 1030 during which the station 600 (in particular its virtual collision handler 212) identifies one active AC queue having a zero queue backoff counter 811 and having the highest AC (inter-queue) priority (in case of several AC queues have a zero backoff value at the same time).

According to embodiments, at step 1040, the station performs an EDCA transmission: an appropriate amount of data is selected from the AC queue selected at step 1030 and the transmission is performed. More specifically, during this step, the station 600 initiates an EDCA transmission, for instance after a successful RTS/CTS exchange to have an EDCA TXOP granted. The station 600 thus sends the selected data on the medium, during the granted EDCA TXOP.

Then, at step 1050, the station 600 determines whether or not the EDCA transmission has ended, in which case step 1060 is executed.

At step 1060, the station 600 updates the EDCA contention window CW, based on the status of transmission (positive or negative ack, or no ack received).

In practice, if the transmission was a failure, the station 600 may double the value of the CW, until the CW reaches the maximum value CWmax which depends on the used AC queue and on the selected EDCA scheme according to embodiments of the invention (that is to say corresponding to the type (priority or not) of the data). Otherwise, if the EDCA transmission was successful, the contention window CW may be set to the minimum value CWmin which is also dependent on the used AC queue and on the selected EDCA scheme according to embodiments of the invention (that is to say corresponding to the type (priority or not) of the data).

According to embodiments, the expiry of the backoff 811 may lead to use either non-degraded values (EDCA parameters set received in a management frame issued by the AP) or degraded values (MU-EDCA parameters set received in a management frame issued by the AP).

Then, if the selected AC queue is not empty after the EDCA transmission of the amount of data determined at step 1040, the process loops back to step 1002 where a new associated queue backoff counter may be randomly selected from the range [0, CW]. It means that the station computes again a new backoff value to reset the expired queue backoff counter, after data stored in the associated traffic queue have been transmitted in the accessed communication channel.

According to an embodiment, the value of the backoff counter 811 is computed again according to the priority of the oldest frame stored in the selected traffic queue 810 and that is the next one to be sent.

In the example illustrated here, the AC queue 810 is based on a conventional FIFO queue meaning that when a frame is the next in the queue ready for transmission, it is analyzed to determine whether it is a priority frame (for instance a control frame or a peer-to-peer frame as described before) or not. If so, the priority frame will be transmitted in priority (non-degraded EDCA parameters) and otherwise, the non-priority frame may be transmitted according to degraded EDCA parameters. In this example, the service time of a priority packet is dependent on the service time of the oldest packets stored in the queue. It is recalled that the service time of a packet can be defined as the time between the instant at which the packet becomes the oldest packet in the queue (it enters in the queue) and the instant at which it is successfully transmitted.

According to other embodiments, an example of which will be described with reference to FIG. 11, the service time of a priority packet is made independent from the service time of the oldest packets stored in the queue. This allows the Head-of-Line blocking commonly observed in FIFO queues to be overcome.

FIG. 11 illustrates, using a flowchart, steps of accessing the medium based on the EDCA medium access scheme for transmitting a new incoming frame (not already stored), according to further embodiments of the invention.

These steps provide an alternative implementation for the step 1002, in which a backoff value is computed to be used in the procedure to initiate an EDCA medium access for new incoming data, i.e. not already stored in the AC queue 810.

In the illustrated example, in the case of a priority frame, if the queue backoff currently running was originally initialized using a MU EDCA (penalty, degraded) scheme, it will be interrupted and the station will compute a new queue backoff value from contention parameters of the EDCA (non-degraded) scheme. Hence, the priority frame will pre-empt a current active backoff countdown.

At step 1101, an incoming frame to be inserted in the AC queue is detected.

In contrast to step 1001 shown in FIG. 10, in which the incoming frame is inserted on top of the queue (as the newest frame) according to a conventional FIFO principle, the incoming frame will not be stored directly into the AC queue in the here described process. A determination step 1102 for the appropriate location is beforehand performed.

Hence, the process of step 1102 provides an enhanced mechanism compared to step 1002 shown in FIG. 10, which starts upon the arrival of new data (e.g. video data or management data) to be stored into the AC queue 810.

At step 1110, it is tested whether the incoming frame is a priority frame.

If so, the station positions this frame as the position of the oldest frame within the AC queue, at step 1120, in order to be the next frame to be sent. One may note that the frame is thus inserted in the AC queue according to a LIFO principle (last in first out), i.e. the most recent frame is inserted so as to be selected first.

Alternatively, if at least one priority frame is already present at this position, the new frame is switched to one rank upper the last (at least one) priority frame already present in the queue.

Next, at step 1121, the current contention mode is checked to determine whether it corresponds to the EDCA (non-degraded) scheme (first type contention mode).

If so, all contention parameters are ready to be used for computing a new backoff value at step 1124. Note that the presence of a previous priority frame in queue 810 leads to a positive determination (in this case, a backoff may be already active, that is to say with a non-zero value according to the non-degraded contention scheme).

Otherwise, i.e. if the test 1121 is negative, the parameters corresponding to the EDCA (non-degraded) scheme have to be considered for the backoff computation.

Before, in the illustrated example, the current parameters, which correspond here to the MU EDCA (penalty, degraded) scheme, are saved in memory at step 1122. As mentioned, these parameters are typically the queue contention parameters as for instance: AIFSN, CWmin and/or CWmax, but also preferably the latest EDCA contention window CW and the current backoff value BO. It is indeed advantageous to memorize the BO value (which is not null due to pre-emption of the first type contention mode) as it can be used subsequently for restoring the pre-empted context in case of switch back. This case will be described in further detail with reference to step 1240.

Then, in the illustrated example, at step 1123, EDCA parameters corresponding to the EDCA (non-degraded) scheme are retrieved from memory. Similarly, these parameters are typically the queue contention parameters as for instance: AIFSN, CWmin and/or CWmax. In this step, it is not necessary to retrieve the latest EDCA contention window CW (as become apparent with step 1230 of FIG. 12, its value is always CWmin). Interestingly, the previous BO value (computed using the first type contention mode) was equal to 0 as the second type contention mode was running (and the second type contention mode cannot pre-empt the backoff as assumed in the illustrated example). This is because, according to embodiments, a transmission of a packet of second type (non-priority) occurs only after a successful transmission of a packet of first type (priority).

Next, at step 1124, a new backoff value is computed based on contention parameters of the first mode. The process then proceeds to step 1010 shown in FIG. 10.

Back to the test 1110, if the incoming frame is of the second type, the frame is considered as a non-priority frame and the frame can be inserted at the entry position of the queue according to a conventional FIFO, in order to be the latest in the queue in the sending order. This insertion is performed at step 1130.

Next, further tests 1131 and 1132 aim at preparing (if required or possible, as detailed below) the environment for sending the non-priority frame. If there is a preceding frame still under processing, no modification would be performed at that time since, in the present example, an incoming non-priority frame shall not pre-empt any current backoff or transmission.

At step 1131, the current contention mode is checked to determine whether it corresponds to the MU EDCA (degraded) scheme (second type contention mode) to be applied for frames of second type.

If so, all contention parameters are ready to be used for computing a new backoff value for the non-priority frame.

At step 1134, a new backoff value is computed using contention parameters of the second type unless a backoff is already active, that is to say with a non-zero value according to the degraded contention scheme. In this case (BO different from 0), it means that a previous non-priority frame has to be transmitted before the incoming frame. No new backoff value is thus computed and the process proceeds to step 1010 shown in FIG. 10.

If the test 1131 is negative, the test 1132 is performed to determine whether the backoff is active or not.

A positive determination in step 1132 leads to proceed to step 1010 shown in FIG. 10, as the first type contention mode has priority in this example.

A negative determination in step 1132 indicates that the backoff has not been initialized, or is inactive for a long time (for example, for more than a TBTT interval, value commonly set as 100 ms). Indeed, after such a long time, the backoff is automatically desactivated. Hence, the incoming non-priority frame is the only one present in the AC queue 810.

The parameters corresponding to the MU EDCA (degraded) scheme are loaded at step 1133. In this example, these parameters are retrieved from memory. As mentioned, these parameters are typically the queue contention parameters as for instance: AIFSN, CWmin and/or CWmax. The backoff computation may use the stored CWmin value as new CW.

Finally, at step 1134, the station computes a new queue backoff value as being equal to a random value selected in range [0, CWmin], where CWmin is the value of the MU-EDCA (degraded) scheme retrieved from memory.

The process then goes to step 1010 shown in FIG. 10.

According to an alternative embodiment, the steps 1101-1120 may be executed but without recomputing the current backoff with new set of contention parameters (only those new priority parameters are stored) if the current backoff value is below a threshold. Typically, this is when the current countdown value is very low, which corresponds to an imminent medium access.

Figure 12:
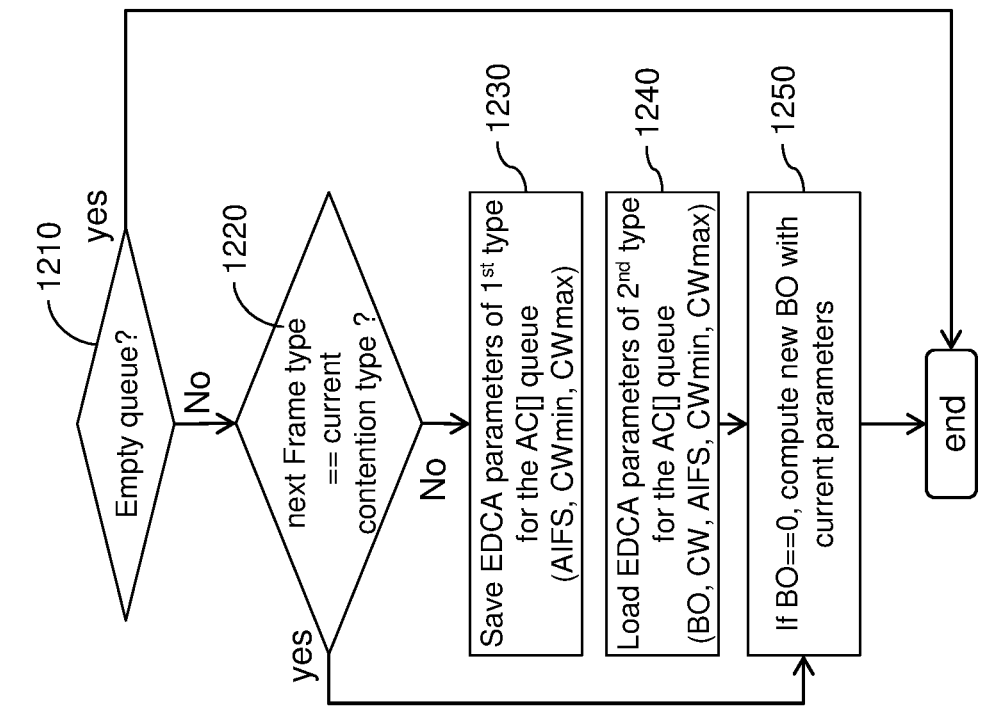
FIG. 12 illustrates, using a flowchart, steps of accessing the medium based on the EDCA medium access scheme for transmitting an already stored frame, according to embodiments of the invention.

FIG. 12 illustrates, using a flowchart, steps of accessing the medium based on the EDCA medium access scheme for transmitting an already stored frame, according to embodiments of the invention.

These steps provide an alternative implementation of the step 1002, in which a backoff value is computed to be used in the procedure to initiate an EDCA medium access for data already stored in the AC queue 810 according to FIG. 11. The steps 1210 to 1250 described here are typically performed after step 1060 shown in FIG. 10.

At step 1210, the station determines whether the queue 810 is empty after the latest transmission. If so, the process stops as it means that there is no data already stored in the AC queue.

Otherwise, a test 1220 is performed to determine whether the next frame is of the same type or of different type compared to the last frame. According to the present invention, it consists in verifying whether or not the contention scheme has to be modified as the type of the next frame to transmit must comply with the type of contention scheme.

If both types are the same, the current scheme is kept and upon expiry of the current backoff (condition BO==0 true), a new backoff value is computed using the current contention parameter mode at step 1250. It should be noted that in the case of a failed transmission, the same frame is retransmitted using the same contention scheme.

Otherwise, if the next frame is of different types, the station performs steps 1230 and 1240.

As explained with reference to FIG. 11, according to embodiments, the MU EDCA contention mode is a default mode and can be pre-empted by the EDCA contention mode in case of arrival of priority data. As a result, the negative test 1220 allows re-validating the pre-empted MU EDCA contention mode.

At step 1230, the station saves in memory the current parameters (which are here of EDCA (non-degraded) scheme). As mentioned, these parameters are typically the queue contention parameters as for instance: AIFSN, CWmin and/or CWmax. It is not useful to save the current EDCA contention window CW after the terminated transmission, since a switch back to the MU EDCA contention mode means that a priority frame has been successfully transmitted and so the CW may take the value of CWmin.

Next, at step 1240, the station may reload the context of MU EDCA parameters in order to transmit non-priority frames. As previously, these parameters are typically the queue contention parameters as for instance: AIFSN, CWmin and/or CWmax. The latest EDCA contention window CW may be judiciously considered as it indicates the kind of contention used on the wireless medium before the pre-emption. In the same way, the previous backoff value (value upon pre-emption) could judiciously be retrieved.

The station then performs step 1250 during which the station computes a new backoff value (if needed, i.e. if the current backoff has expired) for the current contention context.

Figure 13:
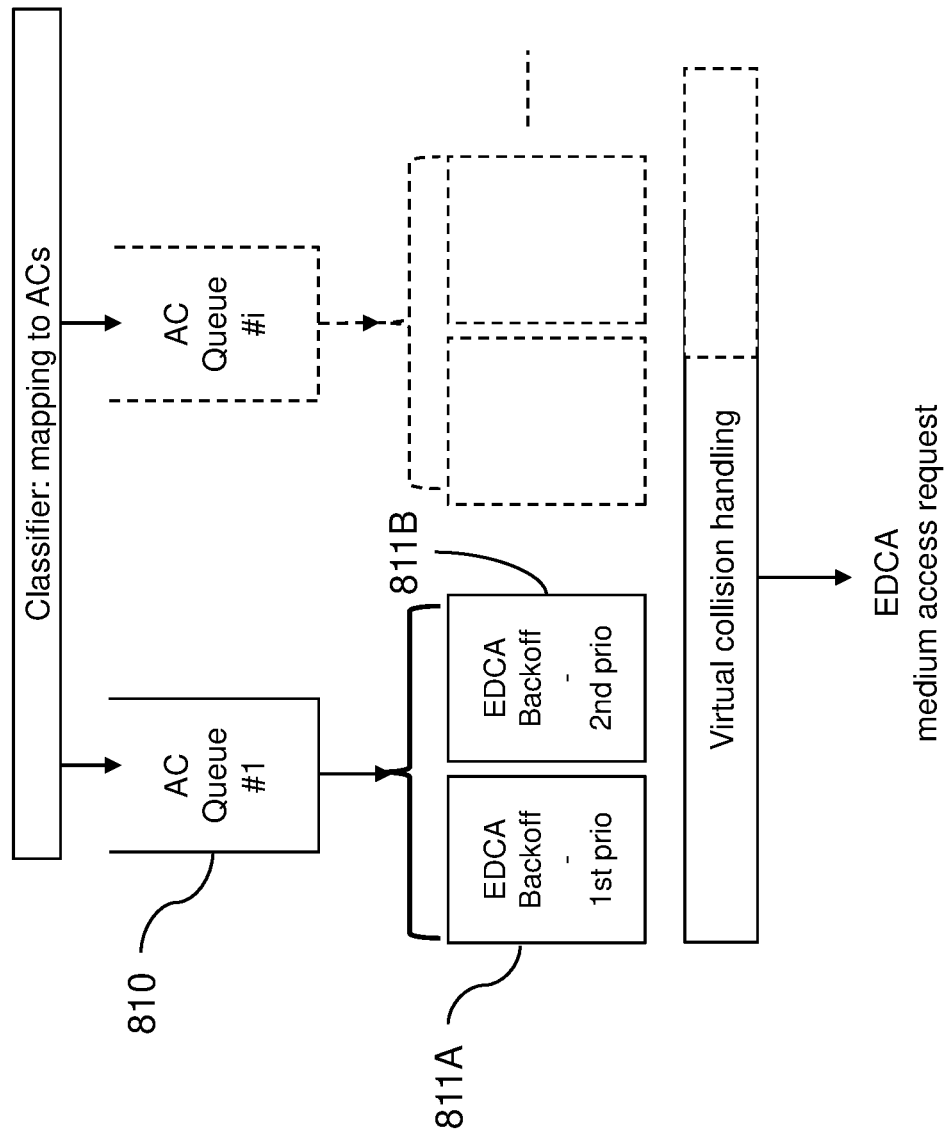
FIG. 13 illustrates the concept of intra-queue priority according to embodiments of the invention.

FIG. 13 illustrates the concept of intra-queue priority according to another aspect of the invention.

In the illustrated example, the station includes at least one AC queue 810 (#1, #i) and at least two backoff engines (811A and 811B) attached to the same queue 810. The two backoff engines may be implemented in a same EDCA access module. Furthermore, it is not necessary to implement one countdown register per backoff engine. For instance, a low-cost implementation may consist in using a unique countdown backoff register, asserted with the lower residual countdown value and the other backoff value(s) can be computed from the value of the countdown register using an offset.

According to embodiments, a first backoff value computed by the first backoff engine is to be used to contend for access, to a communication channel, using first EDCA parameters in order to transmit data (e.g. data packet) of a first type stored in the traffic queue, and the second backoff value computed by the second backoff engine is to be used to contend for access to a communication channel, using second EDCA parameters, different from the first EDCA parameters, in order to transmit data (e.g. data packet) of a second type stored in the traffic queue.

According to embodiments, the first type of packet and the second type of packet are defined so that a packet of the first type has priority over a packet of the second type for transmission. In the following description, a packet of the first type may be referred to as a priority packet.

Hence, according to these embodiments, the priority for transmission is provided on a frame-by-frame basis (intra-queue priority) depending on which backoff expired. This sharply contrasts with existing prioritized MAC schemes of the prior art which more conventionally tend to separate real-time and not-real-time traffics in different queues, and provide strict priority scheduling of those queues towards one single medium access backoff engine. In other words, in the prior art, the priority for transmission is provided on a queue-by-queue basis (inter-queue priority) based on a single queue backoff per queue.

According to first embodiments, the AC queue 810 is a conventional AC queue 210 running a FIFO distribution. Hence, when the first (respectively second) backoff expires, if the oldest data packet stored in the traffic queue is of the first (respectively second) type, it is transmitted, otherwise, the data packet of the first (respectively second) type is not transmitted at this time (i.e. in response to current backoff expiry). If the oldest data packet is of the second (resp. first) type while the first (resp. second) backoff has expired, transmission of the packet of the second (resp. first) type is blocked until the second (resp. first) backoff expires.

According to second embodiments of the invention, the FIFO principle is modified by use of a pointer configured to identify the oldest packet of the first type within the FIFO queue. An example is described in further detail with reference to FIG. 15. In this case, if the first backoff value is zero, the oldest data packet of the first type stored in the traffic queue is transmitted, and if there is no packet of the first type in the queue at this time, no transmission is performed at this time.

According to third embodiments, if the second backoff value is zero, the oldest data packet stored in the traffic queue is transmitted according to a conventional FIFO, no matter its type.

According to fourth embodiments, if the first or the second backoff value is zero, the oldest data packet of the first type stored in the traffic queue are transmitted first, the data packet of the second type being then transmitted upon second backoff expiry if there is no data packet of the first type in the queue at this time.

According to fifth embodiments, if the second backoff value is zero, the oldest data packet of the second type stored in the traffic queue is transmitted, but if there is no data packet of the second type in the queue at this time, the oldest data packet of the first type is transmitted.

According to the 802.11e standard, as described with reference to FIG. 2a/2b, the traffic from two User Priorities (or TID) are mixed in an AC queue but once filled-in, those frames are no longer prioritized into the AC queue which acts as a conventional FIFO.

In contrast, embodiments of the present invention provide for intra-queue priority. More specifically, embodiments of the present invention introduce a new segregation of traffic frames inside the queue 810, which is independent from the original UP/TID classification. In other words, in a single TID point of view, embodiments of the present invention provide intra-TID prioritisation wherein frames having a same TID identification may have different priorities for EDCA medium access contention.

Figure 14:
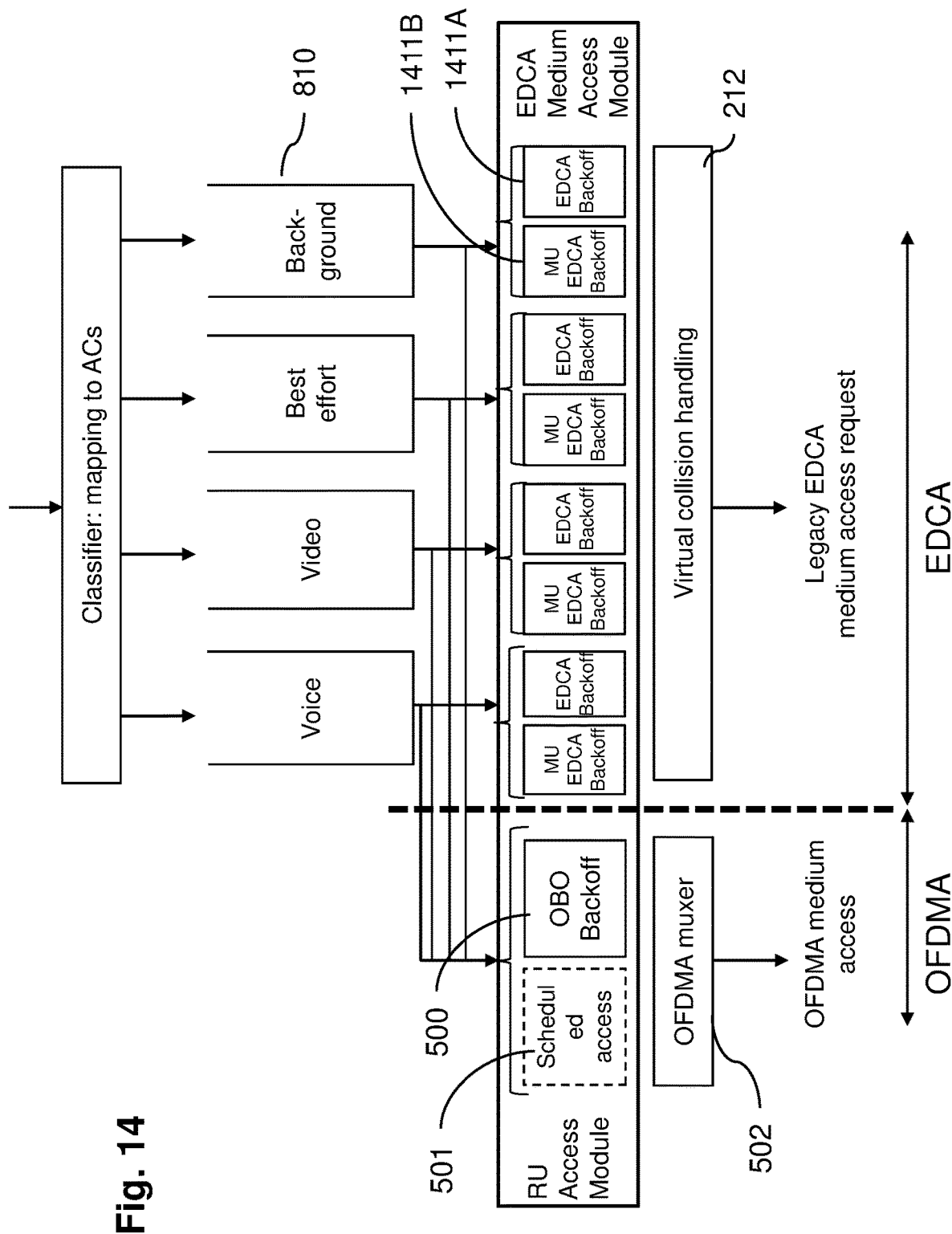
FIG. 14 illustrates an exemplary transmission block of a communication station according to embodiments of the invention.

FIG. 14 illustrates an exemplary transmission block organisation for a communication station 600 according to embodiments.

Compared to the block organisation defined in the 802.11 standard and described with reference to FIG. 5, the channel access module (reference 705 on FIG. 7) implemented in the MAC layer block (reference 702 on FIG. 7) according to embodiments includes a plurality of pairs of queue backoff engines 1411A and 1411B instead of a plurality of single conventional queue backoff engines 211 as shown on FIG. 5.

According to embodiments, a given traffic queue 810 is thus associated with: a first queue backoff engine 1411A, for using a first set of EDCA parameters, in particular to compute a first backoff value, to be used by an associated backoff counter to contend for access to at least one communication channel in order to transmit data stored in the traffic queue. This is the first EDCA access scheme; a second queue backoff engine 1411B, for using a second set of EDCA parameters different from the first set of EDCA parameters, in particular to compute a second backoff value, to be used by an associated backoff counter to contend for access to at least one communication channel in order to transmit data stored in the traffic queue. This is the second EDCA access scheme.

Hence, according to embodiments, two EDCA contention access schemes coexist for a given AC queue, and the station implements a medium access mechanism with collision avoidance based on a computation of at least two backoff values per queue.

Note that the two or more EDCA contention access schemes may refer to a same EDCA medium access protocol configured or which uses different sets of EDCA parameters. Alternatively, or in addition, the EDCA medium access protocol may also differ for different EDCA contention access schemes.

In further detail, the first and second queue backoff values may correspond to a number of time slots for which the station waits, for instance in addition to an AIFS period, after the communication medium has been detected to be idle, before accessing to the medium.

According to an embodiment, the first EDCA access scheme is based on a non-degraded state and the second EDCA access scheme is MU-EDCA, which can be seen as a degraded/penalized state.

According to embodiments, the frames set as priority frames (i.e. corresponding to the data packets of the first type) comprise information to assist the Access Point to provide access to the medium. According to embodiments, the priority data packets comprise control data.

For example, priority frames are generated by the communication station 600 in order to assist the AP to adjust its MU scheduling.

For instance, priority frames may come from the Application layer 701, along with the data frames they are related to.

According to embodiments, the control data provide information on the traffic queue.

For instance, priority frames may be generated by the EDCA medium access module 705. These priority frames may report the status of the corresponding AC queue.

According to embodiments, the control data comprise a Buffer Status Report, BSR, issued by the station.

According to embodiments, the control data comprise a QoS Data frame comprising traffic queue size information. According to embodiments, the control data comprise a QoS_Null frame. A QoS_Null frame is a specific QoS Data frame that contains the QoS Control field with queue size information, but without data payload.

Once the AP has obtained buffer reports for a set of stations of its BSS, it can specifically poll them through scheduled resource unit allocation. The present mechanism allows to faster transmit the report to the AP, so that it can further react immediately to transient variations or discontinuities of real time traffic flows at the stations 600 that it administrates. By decreasing the packet delay for the priority frames, the mechanism ensures better traffic performance for the AP-centralized management of MU transmissions.

Technically, the 802.11ax standard extends the usage of Queue size information in a new QoS Control field, namely HE Control, and possibly in replacement of QoS Control field for 802.11ax frames, in order to inform about several, and preferably all, traffic queues 210/810 of the station, instead of only one as proposed in 802.11e standard. If such format is used for generating a priority frame to assist the AP, the frame should be filled in the AC queue corresponding the higher TID of the reported 810 queues (AC_VOICE being the highest priority queue with regards to 802.11e).

For example, an AC queue may store video data frames along with associated priority frames generated by the communication station 600 in order to assist the AP to adjust its MU scheduling.

In a variant, instead of being inserted into an AC queue, the BSR could be generated "on the fly" by the station in order to be transmitted on the medium without passing through an AC queue.

Generally speaking, the "on the fly" way of generating control frames is not limited to BSR frames and could be envisaged for any requirement perceived by the station and that is mandatory to be urgently emitted to assist the AP.

According to embodiments, the control data comprise an Operating Mode Indication (OMI) indicating a change of operating mode. By using it, a station may thus report an Operating Mode Indication (OMI) change to its associated AP.

According to embodiments, the control data comprise a bandwidth query report, BQR. A station may use it to assist its AP in allocating DL MU and UL MU resources. For example, a station may face difficulties on given wireless channel(s) and may report this issue to its AP in order to be switched onto better channels.

According to embodiments, the control data relate to a management frame for the attention to an Access Point different from the Access Point configured to manage access to a communication channel by a communication device of the communication network, in order to support discovery and/or association with the different AP.

According to embodiments, the control data comprise report frames indicating to the AP an issue for delivering pending frames in MU scheme. For example, the stored frame cannot fit into (i.e. have larger duration than) the allowed duration of the UL RU, so the AP must be aware of this issue for correctly tuning next UL RUs.

As will be described in further detail with reference to FIG. 18, according to embodiments, the control data may indicate whether the amount of data currently stored in the traffic queue is higher than a given threshold. For instance, the control data may indicate whether an occupancy ratio of the traffic queue is higher than a given threshold. In a variant, the control data may indicate whether the amount of data transmitted since a previous BSR is higher than a given threshold.

A complimentary embodiment may consist in tagging priority for data frames intended to direct station-to-station frame transfers within a basic service set. Hence, any data packet related to a frame intended to a peer-to-peer transfer (during which the traffic is not intended to pass through the AP) between communication devices of a same communication cell (a Basic Service Set, BSS) may be set as priority data.

For instance, such a frame is a Direct Link Setup, DLS, introduced in the 802.11e standard. It may also concern a Tunneled Direct Link Setup, TDLS, introduced in the 802.11z standard.

Implementing two queue backoff engines like 1411A and 1411B provides further advantages, especially when application of the MU EDCA mode may be transient. For example, one may consider the TWT (Target Wake Time) mechanism, as defined in the IEEE 802.11ax standard, for the purpose of offering periodic data transmissions periods. A station negotiates TWT awake periods (also called service periods) with its AP to transmit and receive data frames: inside this period, the EDCA may be used. Outside the TWT awake period, the station may enter in doze station or rely on MU EDCA mode to avoid transmission. As a result, embodiments of the invention provide seamless routing of queued data frames to backoff 1411A during an active TWT awake period (respectively to 1411B outside active TWT awake periods). This is performed without the requirement of offloading/reloading a complete backoff context that is mandatory with a conventional implementation relying on one single backoff engine. Preferably, this routing behaviour is only applied for service periods that are not trigger-enabled TWT periods (as a recall, a trigger-enabled TWT period starts by and then only relies on Trigger Frames emitted by the AP).

Figure 15:
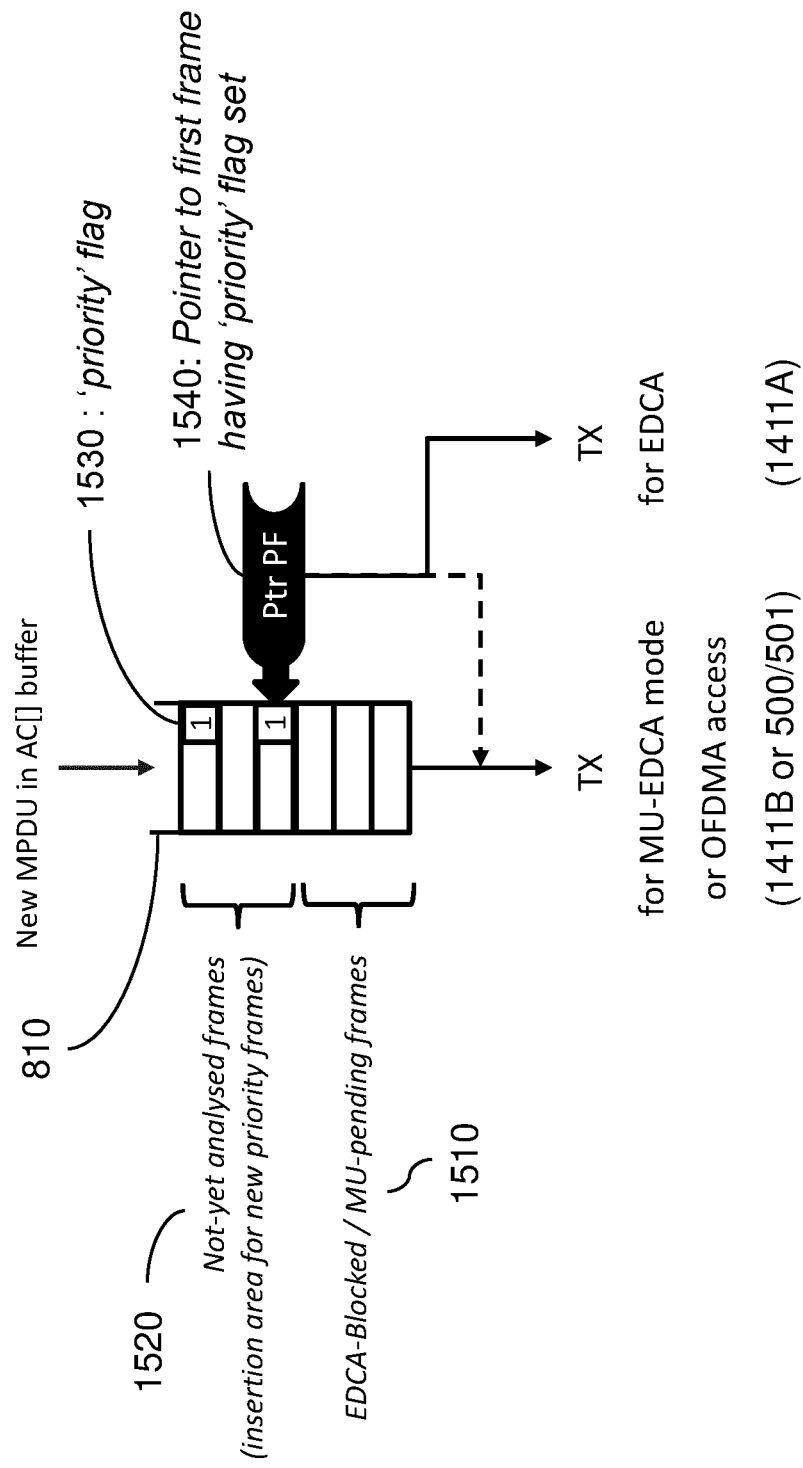
FIG. 15 illustrates an exemplary queuing mechanism of an AC queue 810, according to embodiments of the invention.

FIG. 15 illustrates an exemplary queuing mechanism of an AC queue 810.

Generally, a simple FIFO queue of fixed buffer size remains the most popular strategy applied at 802.11 stations. According to the conventional FIFO strategy, the incoming packets are buffered until the queue is full. When there is no space left, packets are dropped.

The service time of a packet can be defined as the time between the instant at which the packet becomes the oldest packet in the queue and the instant at which it is successfully transmitted.

According to embodiments, the AC queue 810 is based on a conventional FIFO queue, except that it has specific departure conditions for given frames. More specifically, when a frame is ready to enter the queue, it is analyzed to determine whether it is a priority frame (for instance a control frame or a peer-to-peer frame as described before) or not. If so, the priority frame will be transmitted in priority and otherwise, depending on the first and second backoff values, no transmission may occur (e.g. if the first backoff engine 1411A expires) or a non-priority frame may be transmitted (e.g. if the second backoff engine 1411B expires).

For these purposes, a pointer 1540 browses the queue 810 to identify the oldest priority frame stored within the FIFO queue to be transmitted over the medium. In practice, only the "not-yet analyzed frames" area 1020 has to be browsed as the area 1510 comprises only non-priority frames already analyzed, which should be sent through MU-EDCA mode (degraded-EDCA) or MU mode.

In the illustrated example, each packet comprises a priority flag 1530 indicating whether the packet is a priority packet. According to embodiments, the priority flag is coded with one bit. The pointer 1540 has thus to read this flag in order to determine whether the frame has priority or not.

It should be noted, however, that according to alternative embodiments (not shown), a packet could be identified as a priority packet only depending on the type of frame to which it relates.

Back to the given example, according to embodiments, when the EDCA backoff engine 1411B expires, or when the OBO RU backoff engine 500 (if implemented) expires, or when a RU is scheduled by reception of a trigger frame (501), the oldest packet(s) is(are) extracted to be delivered onto the corresponding medium access scheme. In other words, when the queue backoff engine 1411B (degraded) counts down to zero, the oldest frame stored in the traffic queue is transmitted according to a conventional FIFO, no matter its type.

According to other embodiments, when the queue backoff engine 1411B (degraded) counts down to zero, the oldest priority frame identified by the pointer 1540 in the traffic queue is transmitted. This may be the case when the set of frames that fit into an allocated RU encompass the frame pointed by 1540.

According to other embodiments, when the queue backoff engine 1411B (degraded) counts down to zero, the oldest non-priority frame stored in the traffic queue is transmitted, and if there are only priority frames in the queue at this time, the oldest priority frame is transmitted.

According to embodiments, when the queue backoff engine 1411A (non-degraded) counts down to zero, the priority frame pointed by the pointer 1540 departs from the queue in order to be transmitted through EDCA access towards the AP (or alternatively towards a station if the frame pertains to a P2P established session). In a preferred embodiment, upon expiry of queue backoff 1411A, if there is no priority frame in the queue but only non-priority frames (or no frame at all), then no frame is transmitted.

According to embodiments, a new value may be computed for the backoff engine 1411A. The backoff engine may be continuously running to provide more immediate transfer opportunity when a corresponding frame is received locally into the queue. This behavior of recomputing and having a running backoff engine when no corresponding data is waiting sharply contrasts with the conventional EDCA backoff schemes (traditionally a backoff engine is activated upon a frame arrival). Advantage of this is to keep the traditional (non-degraded) EDCA parameters offered by the AP, but with a lower latency medium access.

Thanks to these embodiments, the service time of a packet tagged with priority bit 1530 can be greatly reduced in average compared to the service time of non-priority frames.

Figure 16:
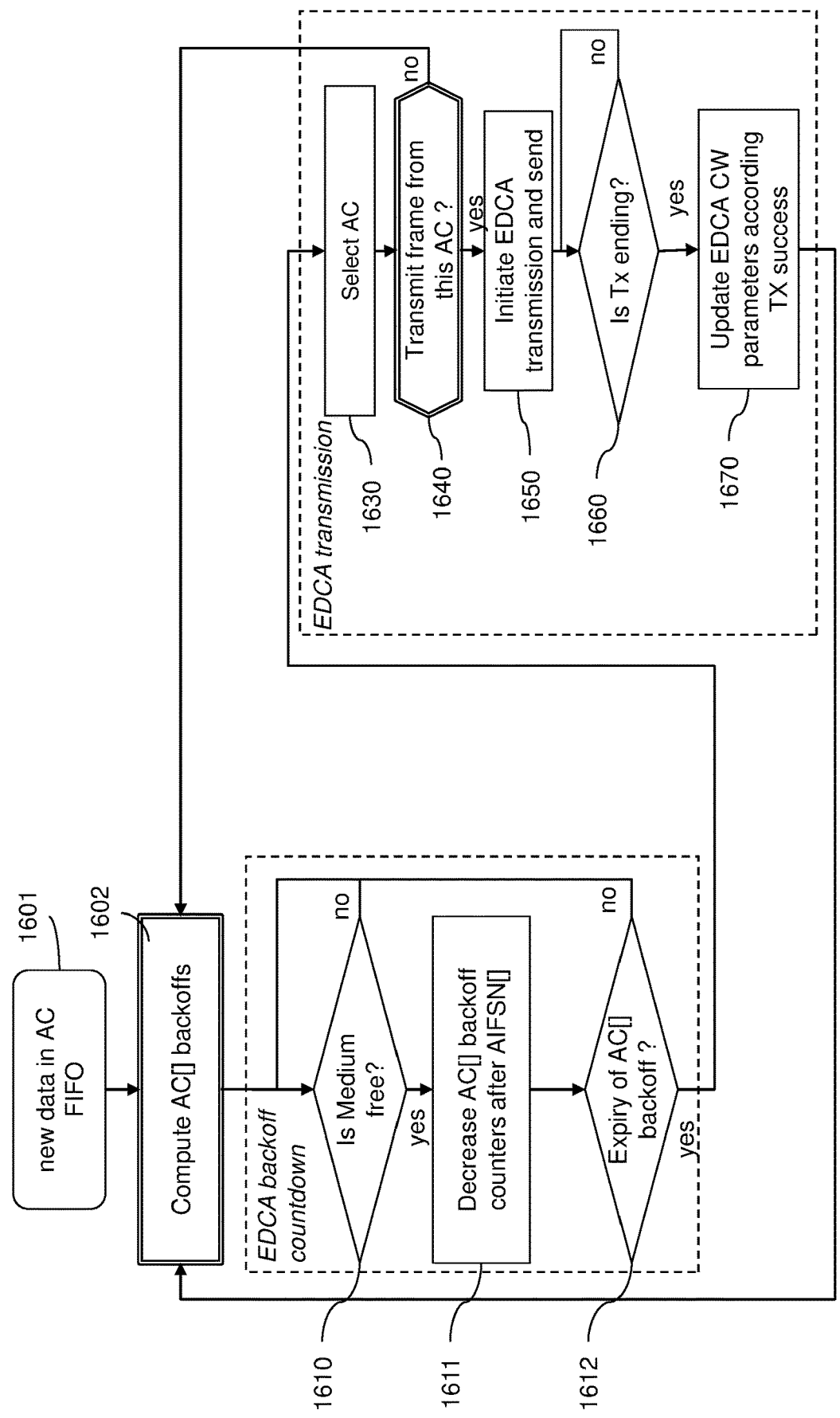
FIG. 16 illustrates, using a flowchart, steps of accessing the medium based on the EDCA medium access scheme, according to embodiments of the invention.

FIG. 16 illustrates, using a flowchart, steps performed by the MAC layer 702 of station 600 according to embodiments, for instance upon receiving new data to transmit (e.g. an MSDU packet) from an upper layer (e.g. from the application layer 701) or when accessing the medium based on the EDCA medium access scheme.

It is assumed that at the very beginning of the process, none of the traffic queues 810 stores data to transmit. Therefore, no queue backoff value has been computed yet. The corresponding queue backoff engines 1411A/1411B or corresponding Access Category AC are/is thus "inactive". According to embodiments, as soon as data are stored in a traffic queue, two queue backoff values are computed (each from queue backoff parameters for instance corresponding to EDCA and MU-EDCA), and the associated queue backoff engines 1411A/1411B or AC are/is "activated". When a station has data ready to be transmitted on the medium, the data are stored in one of the AC queues 810 and the associated backoffs 1411A and 1411B are updated.

A detailed example of this process is now described.

At step 1601, new data (e.g. video data or management data) are received from a local application running on the device (for instance, from application layer 701), from another network interface (including a MAC Layer Management Entity (MLME) of 702) or from any other data source. The new data are ready to be sent by the station over the network. The station determines in which AC queue 810 the data should be stored. This operation is usually performed by checking the TID (Traffic Identifier) value attached to the data (according to the matching shown in FIG. 2b). Next, data frames are stored in the determined AC queue, that is to say the AC queue having the same AC type as the incoming data frame.

In this example, it is assumed that data storage in AC[ ] queue is a prerequisite of any EDCA medium access tentative as the backoff engine 1411A conventionally starts (i.e. is activated) when a packet is received in the AC queue. However, according to other embodiments, the backoff engine 1411A could start before reception of any packet in the AC queue and run continuously even if there is no packet in the AC queue. For instance, it may be started upon startup of the station 600, in order to have some priority data frames (for instance association management frames used to perform fast initial registration to a BSS) generated in live and emitted rapidly.

At step 1602, the station computes the first and second backoff values that will be used in the procedure to initiate a medium access according to embodiments.

According to embodiments, two backoff engines 1411A and 1411B are considered to do so.

According to embodiments, the station computes the first queue backoff value as being equal to a random value selected in range [0, CW], where CW is the current value of the contention window of the EDCA (non-degraded) scheme. This is performed only if the station checks whether the received frame is a priority frame. According to other embodiments, this is always performed upon the expiry of the first queue backoff (or at initialisation as already addressed).

Similarly, the station computes the second queue backoff value as being equal to a random value selected in range [0, CW], where CW is the current value of the contention window of the MU EDCA (penalty, degraded) scheme. This is performed only if the station checks whether the received frame is not a priority frame.

Otherwise, if the received frame is not a priority frame, the station may optionally activate the first backoff engine 1411A and activate the second backoff engine 1411B.

It is recalled here that the queue backoff value will be added to the AIFS in order to implement the relative priorities of the different access categories. CW is a contention window value that is selected from the range [CWmin, CWmax], where both boundaries CWmin and CWmax depend on the considered AC.

Once data are stored in the AC queues, the station may access the medium either directly using an EDCA access scheme (via expiration of the backoff engine 1411A or 1411B), or using resource units provided by the AP through one or more trigger frames, as described previously with reference to FIG. 14.

Steps 1610 to 1612 illustrate an EDCA backoff countdown, aiming at limiting the number of collisions that may occur on a shared wireless medium.

At step 1610, the station 600 senses the medium until it becomes idle. In practice, the medium is detected as being idle when the energy detected on the primary channel is below a given threshold.

When the medium becomes idle during an AIFS[i] period (at least DIFS period, see FIG. 3) plus one slot time, the step 1611 is executed. During this step, the station 600 starts decrementing by one all the active (non-zero) AC[ ] queue backoff counters 1411. In other words, the station decrements the queue backoff values each time the communication channel is detected as idle.

Then, at step 1612, the station 600 determines whether at least one of the AC backoff counters 1411 reaches zero.

If no AC queue backoff has reached zero at step 1612, the station 600 waits for another backoff timeslot (for instance 9 μs), and thus loops back to step 1610 in order to sense the medium again during the next backoff timeslot. This makes it possible to decrement the AC backoff counters at each new backoff timeslot when the medium is sensed as idle, as soon as their respective AIFS[i] have expired.

Otherwise, the process continues to step 1630 during which the station 600 (in particular its virtual collision handler 212) identifies one active AC queue having a zero queue backoff counter 1411x and having the highest AC (inter-queue) priority (in case of several AC queues have a zero backoff value at the same time).

According to embodiments, for a given AC queue, if both backoff counters 1411A and 1411B reach zero at the same time, only one EDCA transmission will occur and both counters are later redrawn. Preferably, transmission of priority data (if any, as pointed by 1540) takes precedence over conventional data.

According to embodiments, at step 1640, the station determines, based on the AC queue identified at step 1630, whether or not to access the communication channel in order to transmit data stored in the associated traffic queue.

According to an alternative embodiment, a new first backoff value may be redrawn upon an expired first queue backoff counter, even if no data from the associated traffic queue is transmitted over the communication channel. In this way, a first backoff value is computed anyway, even if there is no data packet of first type in the traffic queue. This allows improvement of the dynamicity of the 1411A backoff counter even if no priority data is present. For instance, if the first backoff value is zero and there is no data packet of first type in the traffic queue, the computation of the first backoff value is performed based on the same contention window CW (i.e. the current value of the CW is kept). Optionally, if there is no data packet of first type in the traffic queue, the method may comprise generating a data packet of the first type and transmitting it. A new first backoff value may then be computed based on an updated contention window CW relative to the transmission of this specifically generated packet.

The step 1640 is further described with reference to FIG. 17.

Back to the process of FIG. 16, in the case of a negative determination at step 1640 (no transmission of data), the station will postpone all EDCA medium attempts. For this purpose, the process loops back to step 1602 during which a new backoff value is computed, until expiry of which no data will be transmitted through EDCA access.

It should be noted that the EDCA parameters/variables, CWmin, CWmax and the current CW, do not need to be modified when step 1640 leads to a new computation of the backoff value (without EDCA transmission). This is because the value of these parameters evolves during an EDCA transmission and as there is no EDCA transmission performed here, nothing new is known about the EDCA medium conditions.

On the contrary, when, at step 1640, it is decided to perform an EDCA transmission, an appropriate amount of data is selected from the AC queue selected at step 1630 and the transmission is performed (step 1650). More specifically, at this step, the station 600 initiates an EDCA transmission, for instance after a successful RTS/CTS exchange to have an EDCA TXOP granted. The station 600 thus sends the selected data on the medium, during the granted EDCA TXOP.

Then, at step 1660, the station 600 determines whether or not the EDCA transmission has ended, in which case step 1070 is executed.

At step 1670, the station 600 updates the EDCA contention window CW, based on the status of transmission (positive or negative ack, or no ack received).

In practice, if the transmission was a failure, the station 600 may double the value of the CW, until the CW reaches the maximum value CWmax which depends on the AC type of the data and on the expired backoff. Otherwise, if the EDCA transmission was successful, the contention window CW may be set to the minimum value CWmin which is also dependent on the AC type of the data and on the expired backoff.

According to embodiments, the expiry of 1411A backoff may lead to use non-degraded values (EDCA parameter set received in a management frame issued by the AP), whereas an expiry of 1411B backoff may lead to use degraded values (MU-EDCA parameter set received in a management frame issued by the AP).

Then, if the selected AC queue is not empty after the EDCA transmission of the amount of data determined at step 1640, a new associated queue backoff counter may be randomly selected from the range [0, CW] during a new step 1602 after a loop back to this step. It means the station computes again a new backoff value to reset the expired queue backoff counter, after data stored in the associated traffic queue have been transmitted in the accessed communication channel.

According to an embodiment, the value of the backoff counter 1411B is computed again only if the selected traffic queue 810 is not empty, while the value of the backoff counter 1411A may always be computed again.

Figure 17:
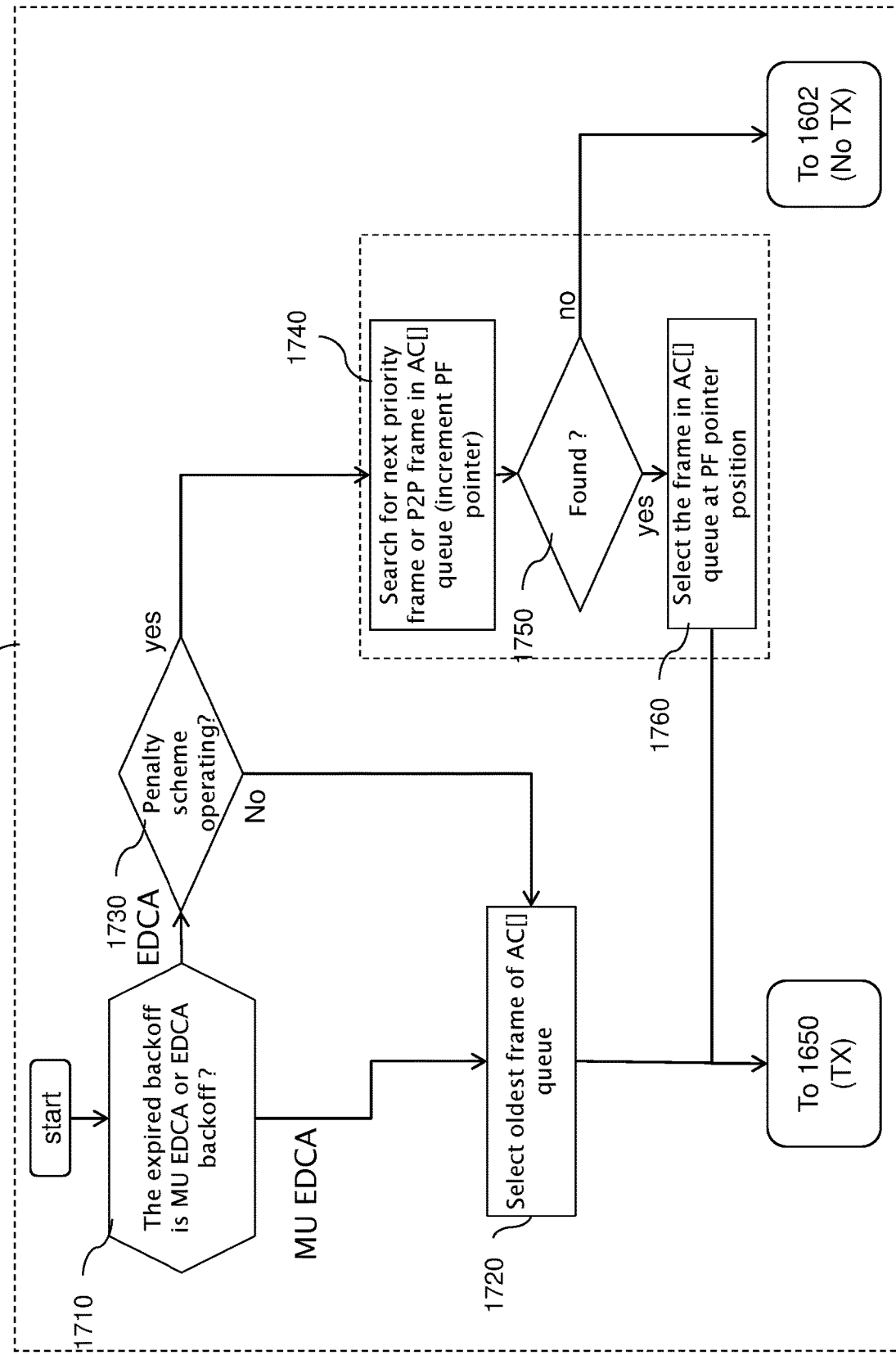
FIG. 17 illustrates, using a flowchart, exemplary steps of selection of frame for EDCA transmission, according to embodiments of the invention.

FIG. 17 illustrates, using a flowchart, exemplary steps of selection of frame for EDCA transmission, according to embodiments of the invention (details the step 1640).

In this example, the process of step 1640 starts upon expiry of one of the backoffs 1411A and 1411B.

At step 1710, it is tested whether it is the MU EDCA backoff 1411B that expired.

If so, the station selects the oldest frame of the queue at step 1720.

If the test 1710 is negative, it means that the EDCA backoff 1411A has expired.

At step 1730, it is tested whether MU EDCA is operating, i.e. whether a penalty scheme is applied to the EDCA medium access. If so, the station selects the oldest frame of the queue at step 1720.

Otherwise, if no MU EDCA scheme is used, the station performs steps 1740-1750-1760 to locate a priority frame in the queue (as described with reference to FIG. 15), and to send it immediately on the wireless medium through the obtained EDCA contention.

According to embodiments, if several priority frames are available in the queue, they may be aggregated in order to fulfill the maximum duration of the conventional 802.11 EDCA TXOP.

If no priority frame is found at step 1750, then no transmission will occur and the backoff value may be computed again at step 1602.

One can note that, as the EDCA backoff values are now always evolving again over time, a regular polling of traffic queues (step 1740/1760) can be performed which provides low latency medium access for those frames.

According to alternative embodiments (not shown), at least one priority frame is selected after step 1710 when the MU EDCA backoff expired (positive test 1710). This is equivalent to have test 1710 followed by test 1750 (for which the negative determination leads to execute step 1720).

Figure 18:
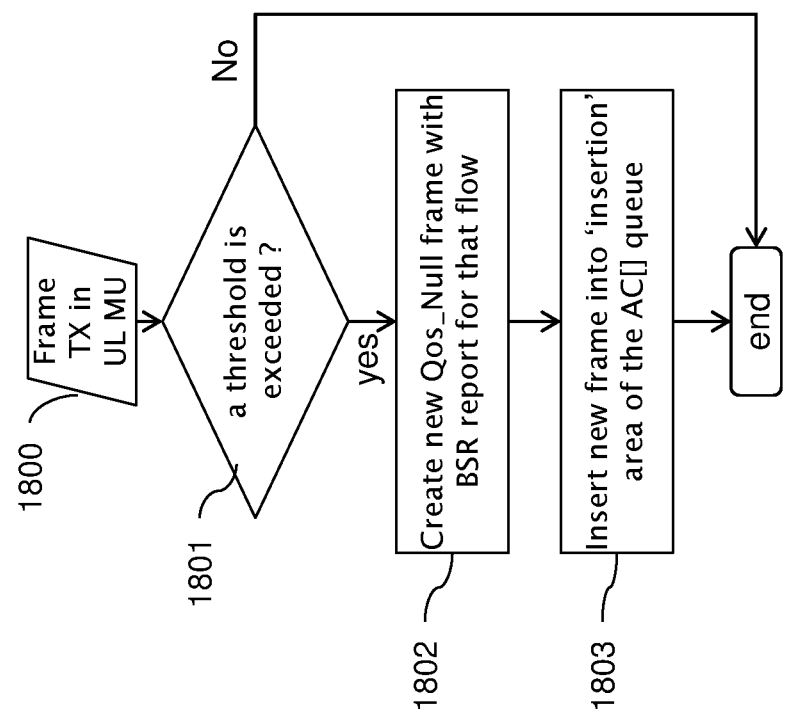
FIG. 18 illustrates, using a flowchart, exemplary steps of generating priority frames when a resource unit based on UL MU access scheme has been provided to the station 600.

FIG. 18 illustrates, using a flowchart, exemplary steps of generating priority frames when a resource unit based on UL MU access scheme (random or scheduled RUs) has been granted to the station 600.

Example is given related to emission of a BSR frame considered as a priority frame for delivery to the AP.

Data transmitted in a resource unit (anyway it is a random or scheduled RU) provided by the access point within a transmission opportunity granted to the access point may be retrieved randomly by decision of the station or from a preferred traffic queue indicated by the access point (through information present inside the trigger Frame).

One may thus note that a plurality of transmitting traffic queues of the same station may be involved during a MU UL (multi-user uplink) OFDMA transmission, thereby resulting in having the plurality of queues been served by the MU EDCA mode. In that condition, the flowchart is executed for each concerned AC queue.

After step 1800, the test 1801 is performed to determine whether the amount of data currently stored in the traffic queue is higher than a given threshold. For example, an amount of transmitted traffic can be compared to the remaining traffic in the queue.

According to an embodiment, it is checked whether an occupancy ratio of the traffic queue is higher than a given threshold.

According to another embodiment, it is checked whether the amount of data transmitted since a previous BSR is higher than a given threshold.

Next, at step 1802, the EDCA medium access module 705 instantiates a frame reporting the status of the corresponding AC queue.

According to an embodiment, the frame is a Buffer Status Report (BSR) issued by the station. For example, it is a QoS_Null frame which is a specific QoS Data frame that contains the QoS Control field with queue size information, but without data payload.

Next, this generated frame is tagged with a priority flag 1530 before been inserted in the 810 AC queue at step 1803. The frame can be inserted anywhere in the area 1520, as described with reference to FIG. 15. Alternatively, if the urgency is highly critical, it can be inserted in the area 1520 according to a LIFO principle (last in first out) (but not lower than the frame pointed by 1540). Note that it may replace the frame pointed by 1540, such than the previous pointed frame is switched one rank upper in the queue.

According to another aspect of the invention, there is provided a communication method in a communication device comprising:
storing a first type data and a second type data belonging to a same access category defined by IEEE802.11 series;
contending for access according to an enhanced distributed channel access, EDCA, using first EDCA parameters, to a communication channel in order to transmit the first type data to another communication device; and
contending for access according to the EDCA, using second EDCA parameters different from the first EDCA parameters, to the communication channel in order to transmit the second type data to the other communication device.

According to embodiments, the storing of first type data and second type data is performed in one traffic queue associated with the same access category.

According to embodiments, the storing of first type data is performed in a first traffic queue and the storing of second type data is performed in a second traffic queue, and wherein both the first and the second traffic queues are associated with the same access category.

According to embodiments, the method further comprises computing a backoff value using a backoff counter to contend for access according to EDCA in order to transmit the first type data and the second type data.

According to embodiments, the method further comprises computing using two backoff counters a first backoff value used to contend for access according to EDCA in order to transmit the first type data, and a second backoff value used to contend for access according to EDCA in order to transmit the second type data.

Although the present invention has been described herein above with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a communication device, the communication method comprising:
storing a first type of data and a second type of data belonging to a same access category defined by IEEE802.11 series;
contending for access to a communication channel according to an enhanced distributed channel access, EDCA, (1) using first EDCA parameters, in order to transmit the first type of data belonging to the access category to the communication device and (2) using second EDCA parameters different from the first EDCA parameters in order to transmit the second type of data belonging to the same access category to the communication device, the contending comprising selecting between the first EDCA parameters and the second EDCA parameters based on whether data belonging to the same access category is of the first type of data or the second type of data, respectively.

2. The method of claim 1, wherein the storing of the first type of data and the second type of data is performed in one traffic queue associated with the same access category.

3. The method of claim 1, wherein the storing of the first type of data is performed in a first traffic queue and the storing of the second type of data is performed in a second traffic queue, and both the first traffic queue and the second traffic queue are associated with the same access category.

4. The method of claim 1, further comprising computing a backoff value using a backoff counter to contend for access according to the EDCA in order to transmit the first type of data and the second type of data.

5. The method of claim 1, further comprising computing, using two backoff counters, a first backoff value used to contend for access according to the EDCA in order to transmit the first type of data, and a second backoff value used to contend for access according to the EDCA in order to transmit the second type of data.

6. The method of claim 1, wherein the communication device includes a common traffic queue for storing the first type of data and the second type of data, and
wherein the method further comprises computing a backoff value to be used for contending for access according to the EDCA, wherein the backoff value is computed using the first EDCA parameters when the data to be transmitted is of the first type and using the second EDCA parameters when the data to be transmitted is of the second type.

7. The method of claim 6, wherein, if the oldest data stored in the traffic queue is of the first type, the backoff value is computed using the first EDCA parameters and, if the oldest data stored in the traffic queue is of the second type, the backoff value is computed using the second EDCA parameters.

8. The method of claim 6, wherein the traffic queue is a queue and wherein any new incoming data of the first type is inserted in the traffic queue at the position of the oldest data in the queue or, if there is already data of the first type at the oldest position, the new incoming data of the first type is inserted at the position of the oldest data of the second type stored in the queue, thereby, the new incoming data of the first type is transmitted in priority over stored data of the second type.

9. The method of claim 6, further comprising, upon arrival of new incoming data of the first type in the traffic queue, if the last backoff value has been computed based on the second EDCA parameters, computing a new backoff value based on the first EDCA parameters.

10. The method of claim 9, wherein, if the new backoff value is zero, transmitting the first type of data.

11. The method of claim 6, further comprising computing a new backoff value upon successful transmission of the first type of data or the second type of data, stored in the traffic queue.

12. The method of claim 6, further comprising, before computing a new backoff value, storing at least one of the current backoff value and/or the first EDCA parameters or the second EDCA parameters used to compute the current backoff value and/or a size of a current contention window.

13. The method of claim 6, further comprising, for computing the backoff value, retrieving a previously stored backoff value and a size of a current contention window previously stored and at least one of the first EDCA parameters and the second EDCA parameters used to compute the previously stored backoff value.

14. The method of claim 1, wherein the communication device includes a common traffic queue for storing the first type data and the second type data,
the method further comprising computing a first backoff value and a second backoff value for the same common traffic queue,
wherein the first backoff value is to be used for contending for access according to the EDCA, using the first EDCA parameters, to the communication channel in order to transmit data of the first type stored in the common traffic queue, and
wherein the second backoff value is to be used for contending for access according to the EDCA, using the second EDCA parameters, to the communication channel in order to transmit data of the second type stored in the common traffic queue.

15. The method of claim 14, further comprising
if the first backoff value is zero, transmitting the oldest data of the first type stored in the traffic queue if there is any data of the first type in the traffic queue, or,
if there is no data of the first type in the traffic queue, postponing the transmission until one of a re-computed first backoff value, or the second backoff value, is zero.

16. The method of claim 14, further comprising, if the second backoff value is zero, transmitting the oldest data stored in the traffic queue.

17. The method of claim 1, wherein the first type of data and the second type of data are defined so that data of the first type has priority over data of the second type for transmission, and any data of the first type is referred to as priority data.

18. The method of claim 1, wherein the first type of data comprises control data.

19. The method of claim 18, wherein the control data provide information on the traffic queue.

20. The method of claim 18, wherein the control data relate to a management frame addressed to an Access Point different from an Access Point configured to manage access to a communication channel by a communication device of the communication network, in order to support at least one of discovery and association with the different Access Point.

21. The method of claim 1, wherein the first type of data relates peer-to-peer data between communication devices of a same communication cell.

22. The method of claim 1, further comprising identifying data as priority data depending on a type of frame to which the data relates.

23. The method of claim 1, wherein the first EDCA parameters and the second EDCA parameters each includes at least one of a minimum boundary CWmin and a maximum boundary CWmax, both defining a selection range from which a size of a contention window is selected, and an Arbitration Inter-Frame Space Number, AIFSN.

24. A communication device in a communication network, the communication device comprising:
a storage for storing a first type of data and a second type of data belonging to a same access category defined by IEEE802.11 series;
a contender device for contending for access to a communication channel according to an enhanced distributed channel access, EDCA, (1) using first EDCA parameters in order to transmit the first type of data belonging to the access category to the communication device and (2) using second EDCA parameters different from the first EDCA parameters in order to transmit the second type data belonging to the same access category to the communication device, wherein the contender device selects between the first EDCA parameters and the second EDCA parameters based on whether data belonging to the same access category is of the first type of data or the second type of data, respectively.

25. The communication device of claim 24, further comprising:
a common traffic queue for storing the first type of data and the second type of data; and
a backoff engine associated with the common traffic queue, to compute a backoff value to be used for contending for access according to the EDCA,
wherein the backoff value is computed using the first EDCA parameters when the data to be transmitted is of the first type and using the second EDCA parameters when the data to be transmitted is of the second type.

26. The communication device of claim 24, further comprising:
a common traffic queue for storing the first type of data and the second type of data; and
a first queue backoff engine and a second queue backoff engine, each associated with the common traffic queue, the first queue backoff engine being configured to compute a first backoff value and the second queue backoff engine being configured to compute a second backoff value for the same common traffic queue as does the first backoff engine,
wherein the first backoff value is to be used for contending for access according to the EDCA, using the first EDCA parameters, to the communication channel in order to transmit data of the first type stored in the common traffic queue, and
wherein the second backoff value is to be used for contending for access according to the EDCA, using the second EDCA parameters, to the communication channel in order to transmit data of the second type stored in the common traffic queue.

27. The method of claim 14, further comprising if the first backoff value is zero, determining if there is any data of the first type in the traffic queue and then (a) if there is any data of the first type in the traffic queue, transmitting the oldest data of the first type stored in the traffic queue and (b) if there is no data of the first type in the traffic queue, postponing the transmission until either (i) a re-computed first backoff value is zero or (ii) the second backoff value is zero.

\* \* \* \* \*